United States Patent
Kimura

(10) Patent No.: US 9,718,292 B2
(45) Date of Patent: Aug. 1, 2017

(54) EXAMINING APPARATUS, EXAMINING METHOD AND IMAGE RECORDING APPARATUS

(71) Applicant: FUJIFILM Corporation, Tokyo (JP)

(72) Inventor: Yosuke Kimura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/254,679

(22) Filed: Sep. 1, 2016

(65) Prior Publication Data
US 2017/0057266 A1 Mar. 2, 2017

(30) Foreign Application Priority Data

Sep. 2, 2015 (JP) ................ 2015-172800

(51) Int. Cl.
 *B41J 29/393* (2006.01)
 *H04N 1/00* (2006.01)
 *B41J 2/01* (2006.01)

(52) U.S. Cl.
 CPC .......... *B41J 29/393* (2013.01); *B41J 2/01* (2013.01); *H04N 1/00039* (2013.01); *H04N 1/00084* (2013.01); *H04N 1/00795* (2013.01); *H04N 2201/0082* (2013.01)

(58) Field of Classification Search
 CPC . B41J 2/04561; B41J 2/01; B41J 2/125; B41J 2/0451; B41J 29/393; B41J 2/0456; G01V 8/20; G01V 8/12; H04N 1/00039; H04N 1/00084; H04N 1/00795; H04N 1/0082
 See application file for complete search history.

(56) References Cited

U.S. PATENT DOCUMENTS

| | | | | |
|---|---|---|---|---|
| 6,347,856 | B1 * | 2/2002 | Arquilevich | B41J 2/2135 347/19 |
| 2001/0009429 | A1 * | 7/2001 | Soto | B41J 2/2135 347/19 |

FOREIGN PATENT DOCUMENTS

JP         2013-110582 A      6/2013

\* cited by examiner

*Primary Examiner* — Thinh H Nguyen

(74) *Attorney, Agent, or Firm* — Birch, Stewart, Kolasch & Birch, LLP

(57) ABSTRACT

An examining apparatus, examining method and an image recording apparatus which analyze the state of a print image irrespective of variation in contrast performance of an optical unit of a reading device are provided. An examining apparatus includes: a reading device configured to read an image recorded by a recording head to output a reading result and including at least one optical unit including an image capturing element and a lens; an analyzing device configured to analyze a state of the recording head or a state of the image by comparing the reading result to a threshold; an index acquiring device configured to acquire an index indicating contrast performance for each divided reading region obtained by dividing a reading region of the reading device into a plurality of regions; and a correcting device configured to correct the threshold for the divided reading region based on the acquired index.

12 Claims, 23 Drawing Sheets

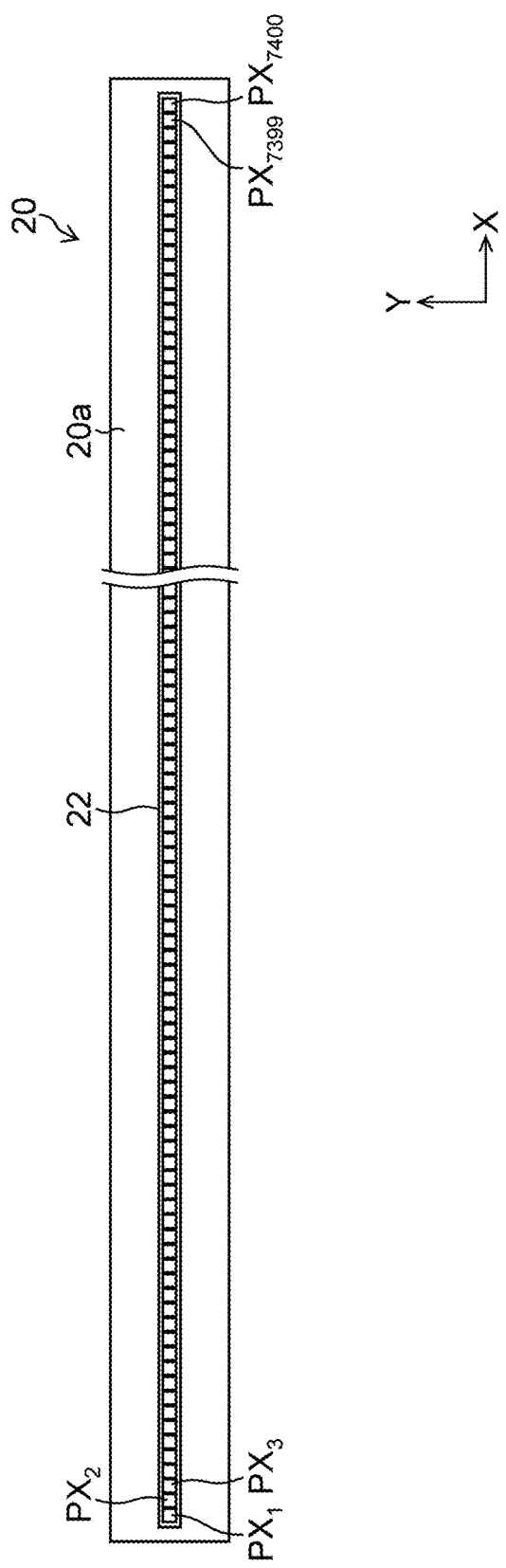

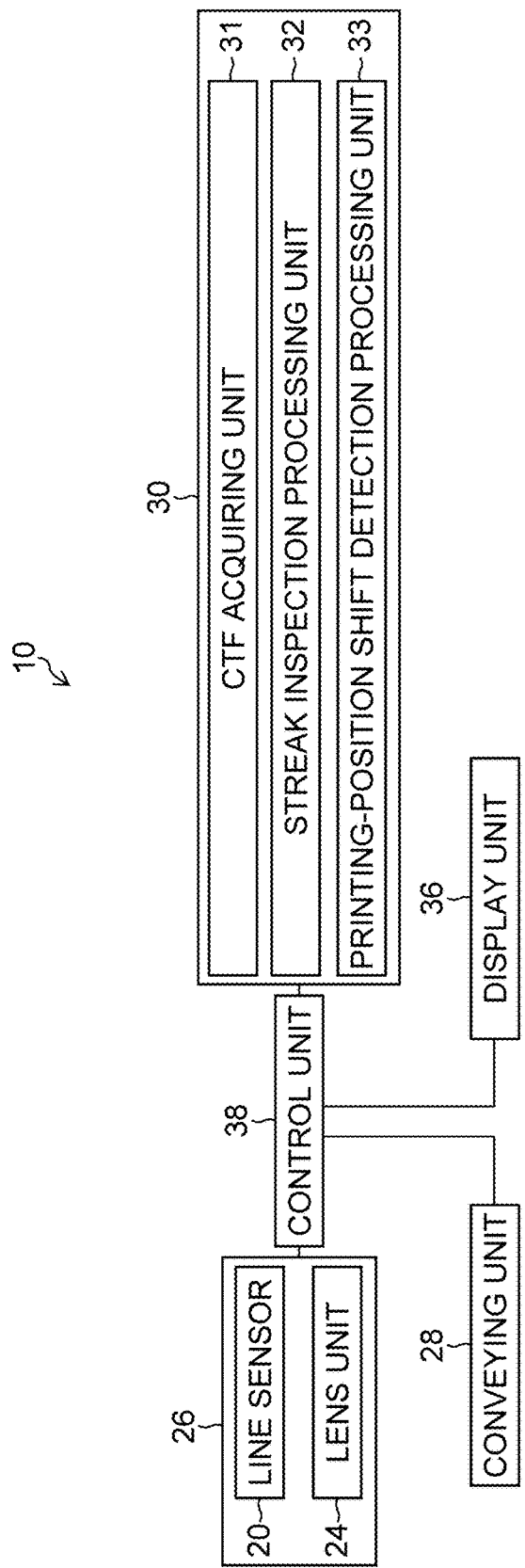

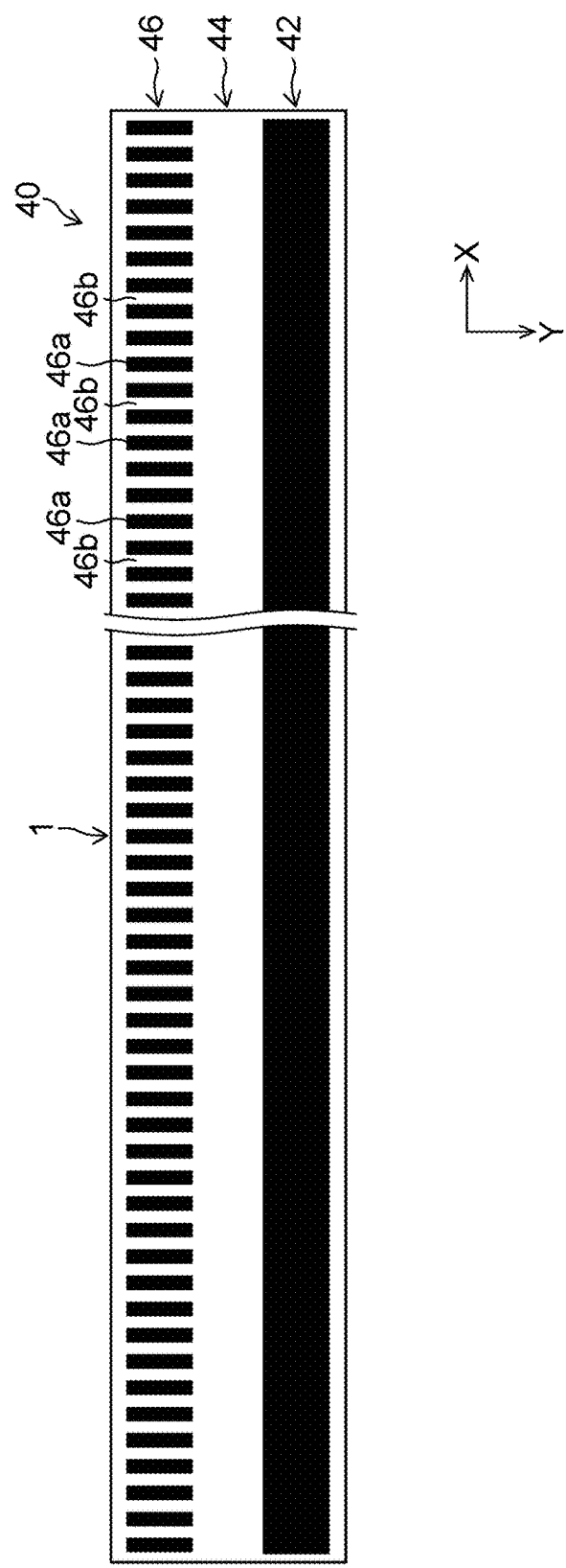

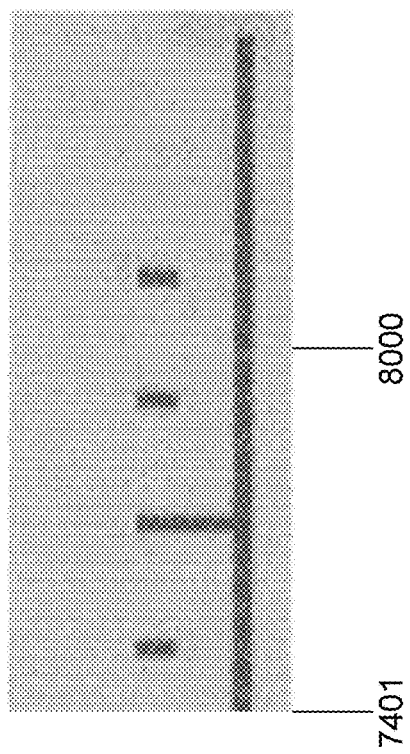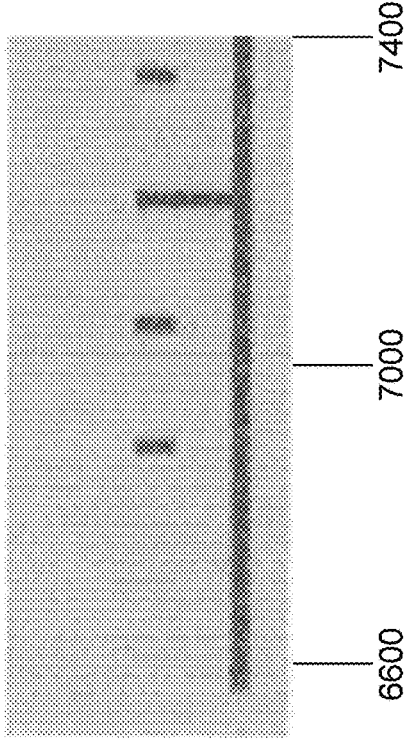

EXAMINING APPARATUS, EXAMINING METHOD AND IMAGE RECORDING APPARATUS

CROSS-REFERENCE TO RELATED APPLICATIONS

The present application claims priority under 35 U.S.C. §119 to Japanese Patent Application No. 2015-172800, filed on Sep. 2, 2015. The above application is hereby expressly incorporated by reference, in its entirety, into the present application.

BACKGROUND OF THE INVENTION

Field of the Invention

The present invention relates to an examining apparatus, examining method and an image recording apparatus, and particularly relates to technology of analyzing a state of an image read by an image reading apparatus.

Description of the Related Art

An image reading apparatus reads an image printed by an image recording apparatus to analyze the state of the image. This image reading apparatus includes, for example, a linear arrangement of a plurality of light receiving elements. In such an image reading apparatus, variation in the optical performance of the light receiving elements between regions affects the analysis result of the image, which is a problem.

To solve this problem, Japanese Patent Laid-open No. 2013-110582 discloses the technology of generating a read image in which variation in contrast is corrected by performing a modulation transfer function (MTF) correction.

SUMMARY OF THE INVENTION

However, the MTF correction disclosed in Japanese Patent Laid-open No. 2013-110582 potentially corrects a noise component as well. For example, when correction to increase the contrast is performed on a region in which the contrast is degraded (small) as compared to other parts, or high-pass filter processing is performed for edge enhancement, noise in a light-receiving signal is potentially enhanced as well. Such noise enhancement adversely causes large degradation of image reading performance.

In light of the aforementioned situation, the object of the present invention is to provide an examining apparatus, examining method, and an image recording apparatus which analyze the state of a print image irrespective of variation in the contrast performance of an optical unit of a reading device.

In order to achieve the above object, an examining apparatus according to an aspect of the present invention includes: a reading device configured to read an image recorded by a recording head to output a reading result and including at least one optical unit including an image capturing element and a lens; an analyzing device configured to analyze a state of the recording head or a state of the image by comparing the reading result to a threshold; an index acquiring device configured to acquire an index indicating contrast performance of the optical unit for each of divided reading regions obtained by dividing a reading region of the reading device into a plurality of regions; and a correcting device configured to correct the threshold for the divided reading region based on the acquired index.

According to this aspect, the index indicating the contrast performance of the optical unit for each of the divided reading regions obtained by dividing the reading region of the reading device into a plurality of regions is acquired, and the threshold is corrected for the divided reading region based on the acquired index. This allows analysis of the state of a print image irrespective of variation in the contrast performance of the optical unit.

It is preferable that the correcting device corrects the threshold to be lower for a divided reading region for which the contrast performance is lower. Alternatively, the correcting device may correct the threshold to be lower for a divided reading region for which the contrast performance is relatively low in the reading region. This allows analysis of the state of a print image irrespective of variation in the contrast performance of the optical unit.

It is preferable that the reading device includes a plurality of optical units, parts of reading regions of the optical units overlapping with each other, and the examining apparatus includes a selecting device configured to select an optical unit a reading result of which is used by the analyzing device to analyze the state of the image for the overlapping reading regions, the index acquiring device acquires the index of each optical unit of the optical units for the overlapping reading regions, and the selecting device selects the reading result of an optical unit the contrast performance of which is high. This allows use of the reading result of an appropriate optical unit for the overlapping reading regions.

It is preferable to include a range acquiring device configured to acquire ranges of the overlapping reading regions in the reading region of each optical unit of the optical units. This allows acquisition of the ranges of the overlapping reading regions. Accordingly, the ranges of the overlapping reading regions can be acquired appropriately even when the overlap reading regions are different between apparatuses due to variation in manufacturing and the accuracy of assembly.

In order to achieve the above object, an image recording apparatus according to another aspect of the present invention includes: a conveying device configured to convey a sheet recording medium; a recording head configured to record an image on the conveyed recording medium by a single pass method through a plurality of recording elements; and an examining apparatus configured to examine the conveyed recording medium and including a reading device configured to read an image recorded by the recording head to output a reading result and including at least one optical unit including an image capturing element and a lens, an analyzing device configured to analyze a state of the recording head or a state of the image by comparing the reading result to a threshold, an index acquiring device configured to acquire an index indicating contrast performance of the optical unit for each of divided reading regions obtained by dividing a reading region of the reading device into a plurality of regions, and a correcting device configured to correct the threshold for the divided reading region based on the acquired index.

According to this aspect, the index indicating the contrast performance of the optical unit for each of divided reading regions obtained by dividing the reading region of the reading device into a plurality of regions is acquired, and the threshold is corrected for the divided reading region based on the acquired index. This allows analysis of the state of a print image in which an image is recorded on the sheet recording medium by the single pass method through the recording elements irrespective of variation in the contrast performance of the optical unit.

It is preferable that the recording head is an ink-jet head configured to eject ink from a plurality of nozzles to record an image on the recording medium. This aspect is suitable to an image recording apparatus in which the ink-jet head configured to eject ink from a plurality of nozzles to record an image on the recording medium is applied as a recording head.

It is preferable that the ink-jet head records, on the recording medium, a non-ejection detecting pattern for detecting a non-ejection nozzle, the reading device reads the non-ejection detecting pattern, the index acquiring device acquires a contrast transfer function as the index based on a reading result of the non-ejection detecting pattern, and the analyzing device detects an ejection misaligned nozzle based on the corrected threshold and the reading result of the non-ejection detecting pattern. This allows the non-ejection detecting pattern to be used for the acquisition of a contrast transfer function, the detection of a non-ejection nozzle, and the detection of an ejection misaligned nozzle. The use of the contrast transfer function as the index indicating the contrast performance allows the contrast performance to be appropriately expressed.

It is preferable that the ink-jet head records the non-ejection detecting pattern on each conveyed recording medium, and the index acquiring device acquires the index for the conveyed recording medium. When, for example, a wrinkle is generated on the conveyed recording medium, the state of an image changes accordingly. Thus, the acquisition of the index for each conveyed recording medium allows analysis of an image in accordance with the state of the recording medium.

It is preferable that the analyzing device detects a strength of a streak generated in the image based on a reading result obtained by the reading device and performs streak defect determination of the image by comparing the detected strength of the streak to a threshold. This allows appropriate execution of the defect determination of a streak as an image defect generated in the image.

In order to achieve the above object, an examining method according to another aspect of the present invention includes: a reading step of reading, by a reading device including at least one optical unit including an image capturing element and a lens, an image recorded by a recording head, and of outputting a reading result; an analyzing step of analyzing a state of the recording head or a state of the image by comparing the reading result and a threshold; an index acquiring step of acquiring an index indicating contrast performance of the optical unit for each of divided reading regions obtained by dividing a reading region of the reading device into a plurality of regions; and a correcting step of correcting the threshold for the divided reading region based on the acquired index.

According to this aspect, the index indicating the contrast performance of the optical unit for each of divided reading regions obtained by dividing the reading region of the reading device into a plurality of regions is acquired, and the threshold is corrected for the divided reading region based on the acquired index. This allows analysis of the state of a print image irrespective of variation in the contrast performance of the optical unit.

In order to achieve the above object, a non-transitory tangible computer-readable recording medium according to another aspect of the present invention includes instructions stored thereon, such that when the instructions are read and executed by a processor of a computer, the processor is configured to cause the computer to achieve: a reading function of reading, by a reading device including at least one optical unit including an image capturing element and a lens, an image recorded by a recording head, and of outputting a reading result; an analyzing function of analyzing a state of the recording head or a state of the image by comparing the reading result to a threshold; an index acquiring function of acquiring an index indicating contrast performance of the optical unit for each of divided reading regions obtained by dividing a reading region of the reading device into a plurality of regions; and a correcting function of correcting the threshold for the divided reading region based on the acquired index.

According to this aspect, the index indicating the contrast performance of the optical unit for each of divided reading regions obtained by dividing the reading region of the reading device into a plurality of regions is acquired, and the threshold is corrected for the divided reading region based on the acquired index. This allows analysis of the state of a print image irrespective of variation in the contrast performance of the optical unit.

According to the present invention, it is possible to analyze the state of a print image irrespective of variation in the contrast performance of the optical unit in the reading device.

BRIEF DESCRIPTION OF THE DRAWINGS

FIG. 2 is a diagram illustrating a reading surface of a light-receiving portion;

FIG. 3 is a functional block diagram of the examining apparatus;

FIG. 4 is a diagram illustrating a reference chart for acquiring a CTF of each divided reading region of an optical unit;

FIGS. 27A and 27B are diagrams illustrating a read image of the overlapping-reading region detecting pattern obtained by an image capturing unit.

DETAILED DESCRIPTION OF THE EMBODIMENTS

The embodiments of the present invention will be described below with reference to the accompanying drawings.

Configuration of Examining Apparatus

Figure 1:
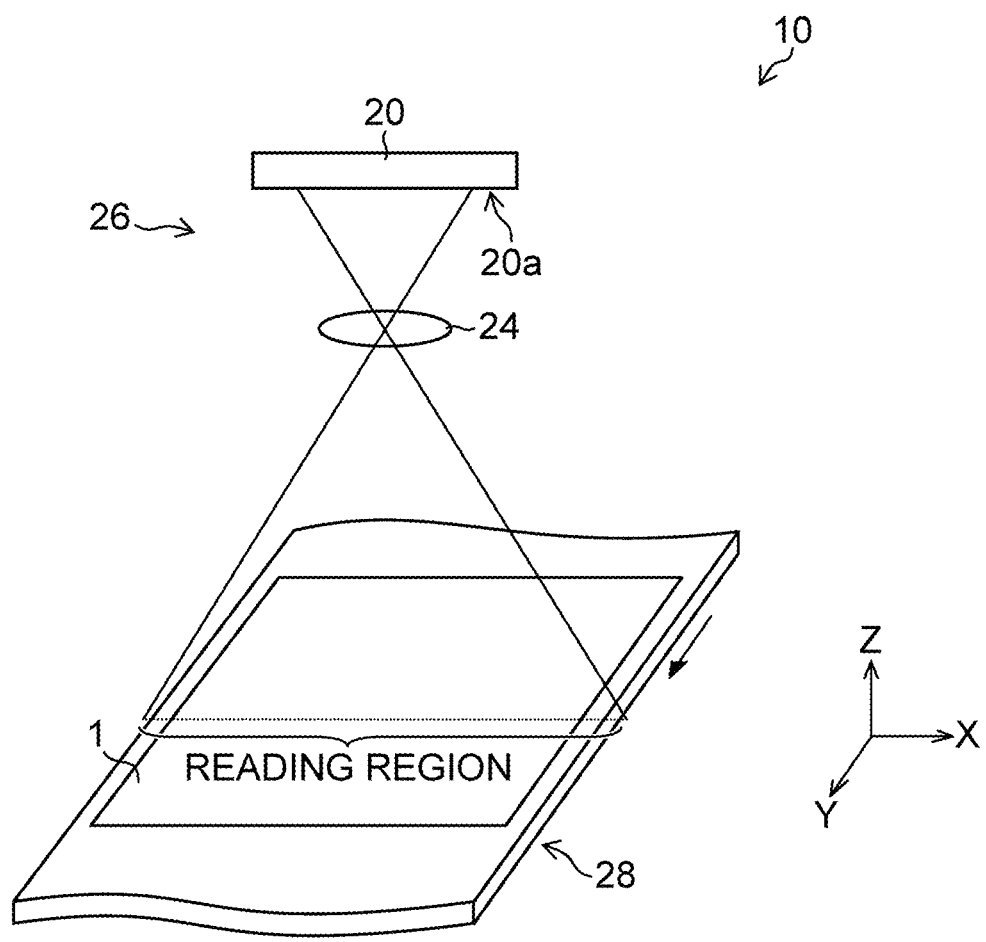
FIG. 1 is a schematic exterior diagram of an examining apparatus.

An examining apparatus 10 (exemplary examining apparatus) is configured to examine an image printed (recorded) on a recording surface of a conveyed sheet 1, and includes a line sensor 20, a lens unit 24, and a conveying unit 28 as illustrated in FIG. 1.

The sheet 1 is a sheet recording medium. The sheet 1 is conveyed in a conveyance direction (Y direction) by the conveying unit 28 while the recording surface thereof, on which an image is printed by a recording head (not illustrated in FIG. 1), faces in a vertically upward direction (Z direction).

The line sensor 20 is provided on a conveyance path above the sheet 1 in the vertically upward direction. The line sensor 20 has a reading surface 20a thereof facing in a vertically downward direction. As illustrated in FIG. 2, a monochrome image capturing element 22 such as a charge-coupled device (CCD) or a complementary metal oxide semiconductor (CMOS) is provided on the reading surface 20a. The image capturing element 22 includes 7400 pixels $PX_i$ (i=1, 2, . . . , 7400) arrayed in a column in a direction (X direction) orthogonal to the conveyance direction of the sheet 1. The number of pixels of the image capturing element 22 may be set as appropriate.

In the present embodiment, the line sensor 20 is the monochrome one-dimensional line sensor. However, the present embodiment is applicable to a configuration including a one-dimensional line sensor including an integral formation of two or more pixel columns having different spectral sensitivities, such as a color line sensor including R, G, and B color filters. In addition, the present embodiment is applicable to a configuration including a two-dimensional planar sensor.

In FIG. 1, the fixed focal lens unit 24 is provided between the conveyance path of the sheet 1 and the line sensor 20, and a pair of the line sensor 20 and the lens unit 24 constitute one optical unit 26 (exemplary reading device). The lens unit 24 focuses on the recording surface of the sheet 1 to image a certain region (reading region) of the recording surface of the sheet 1 onto the image capturing element 22. An illumination may be included to irradiate the reading region with light.

As illustrated in FIG. 3, the examining apparatus 10 includes an image processing unit 30, a display unit 36, and a control unit 38 in addition to the optical unit 26 and the conveying unit 28.

The image processing unit 30 includes a CTF acquiring unit 31, a streak inspection processing unit 32, and a printing-position shift detection processing unit 33. The CTF acquiring unit 31 (exemplary index acquiring device) acquires a contrast transfer function (CTF) that is an index indicating contrast performance of the optical unit 26. The streak inspection processing unit 32 (exemplary analyzing device, exemplary correcting device) analyzes the state of an image printed on the sheet 1 based on a read image (exemplary reading result) of the optical unit 26, and performs defect determination (streak inspection) of the image. The printing-position shift detection processing unit 33 (exemplary analyzing device, exemplary correcting device) analyzes the state of the image printed on the sheet 1 based on the read image of the optical unit 26, and performs detection (printing-position shift detection) of any defective recording element among recording elements (not illustrated in FIG. 3) of the recording head, which has printed the image on the sheet 1.

The display unit 36 is a display that displays a result of the defect determination by the streak inspection processing unit 32 and the printing-position shift detection processing unit 33.

The control unit 38 controls the optical unit 26, the conveying unit 28, the image processing unit 30, and the display unit 36, thereby performing overall control of the entire operation of the examining apparatus 10.

The examining apparatus 10 configured in this manner operates as described below. First, the conveying unit 28 conveys the sheet 1 in the conveyance direction. The lens unit 24 images the reading region of the recording surface of the conveyed sheet 1 onto the image capturing element 22. The line sensor 20 captures an image of the imaged recording surface of sheet 1 through the image capturing element 22, and outputs this read image data (hereinafter referred to as a read image). The control unit 38 controls the image processing unit 30 so as to perform processing including acquisition of the CTF of the optical unit 26, streak inspection, and printing-position shift detection based on the read image. The display unit 36 displays results of these pieces of processing.

CTF Acquisition

The following describes a method of acquiring the CTF of the optical unit 26. In the description below, the reading region of the optical unit 26 is divided into a plurality of regions (divided reading regions), and a CTF (local CTF) for each divided reading region is acquired.

FIG. 4 is a diagram illustrating a reference chart 40 for acquiring the CTF of the optical unit 26 for each divided reading region, and the reference chart 40 is printed on the white sheet 1 in the present embodiment. The reference chart 40 is not limited to the sheet 1, but may be printed on any object conveyable by the conveying unit 28. The reference chart 40 is wider than the reading region of the optical unit 26 in the X direction, and includes a solid part 42, a blank part 44, and a pattern part 46 arranged in this order in the Y direction.

A black uniform-concentration image is arranged in the solid part 42. No image is arranged in the blank part 44, in which the surface of the sheet 1 is exposed. In the pattern part 46, a black part 46a and a white part 46b are alternately arranged in the X direction. The black part 46a is a black rectangular uniform-concentration region, and the white part 46b is a region in which the surface of the sheet 1 is exposed.

The examining apparatus 10 conveys, in the Y direction through the conveying unit 28, the sheet 1 on which the reference chart 40 is recorded, and reads the sheet 1 through the optical unit 26. An image read by the optical unit 26 has a larger pixel value in a read region closer to while, and has a smaller pixel value in a read region closer to black.

The CTF acquiring unit 31 acquires the read image of the optical unit 26 through the control unit 38, and generates divided read images obtained by dividing the read image into 37 regions with equal widths in the X direction. Each divided read image corresponds to a read image of 200 pixels continuously arranged in the X direction on the image capturing element 22.

The CTF acquiring unit 31 acquires, from each divided read image, a minimum value $VA_{MIN}$ of the pixel value of the solid part 42, a maximum value $VA_{MAX}$ of the pixel value of the blank part 44, a minimum value $VB_{MIN}$ of the pixel value of the pattern part 46, and a maximum value $VB_{MAX}$ of the pixel value of the pattern part 46. Then, the CTF acquiring unit 31 calculates the $CTF_j$ (j=1, 2, ..., 37) of each divided reading region by using Equation 1 below.

$$CTF_j = (VB_{MAX} - VB_{MIN})/(VA_{MAX} - VA_{MIN}) \quad \text{(Equation 1)}$$

In this manner, the CTF of each divided reading region of the optical unit 26 can be acquired from the corresponding divided read image, the divided reading region including 200 pixels. The CTF has a larger value for better contrast performance.

The reference chart 40 may include only the pattern part 46, and previously stored values may be used as the minimum value $VA_{MIN}$ of a read pixel value of the solid part 42 and the maximum value $VA_{MAX}$ of a read pixel value of the blank part 44.

Streak Inspection

The following describes the streak inspection of a print piece by the examining apparatus 10. The streak inspection detects a print piece in which a streak image defect (hereinafter simply referred to as a streak) extending in the Y direction is generated in a print image, and determines the print piece as a defect print piece.

Figure 5A:
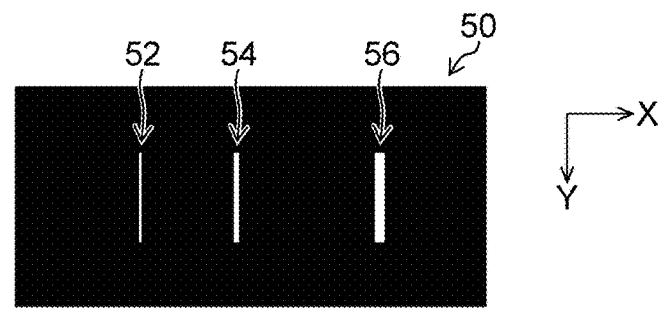
FIGS. 5A to 5C are diagrams for explaining streak inspection.

FIG. 5A illustrates an exemplary image 50 printed on the sheet 1. In this example, a streak 52 as an allowable image defect, and streaks 54 and 56 as disallowable image defects are generated in the image 50.

Figure 5B:
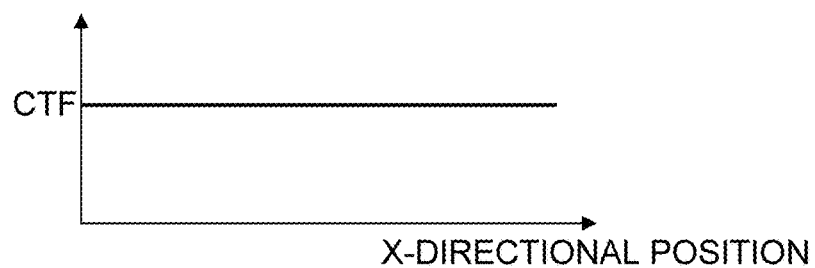

FIG. 5B is a diagram illustrating an exemplary CTF characteristic of the optical unit 26, in which the horizontal axis represents the X directional position of each divided reading region, and the vertical axis represents the CTF of the divided reading region. In this example, the CTF has a constant value irrespective of the X directional position.

Figure 5C:
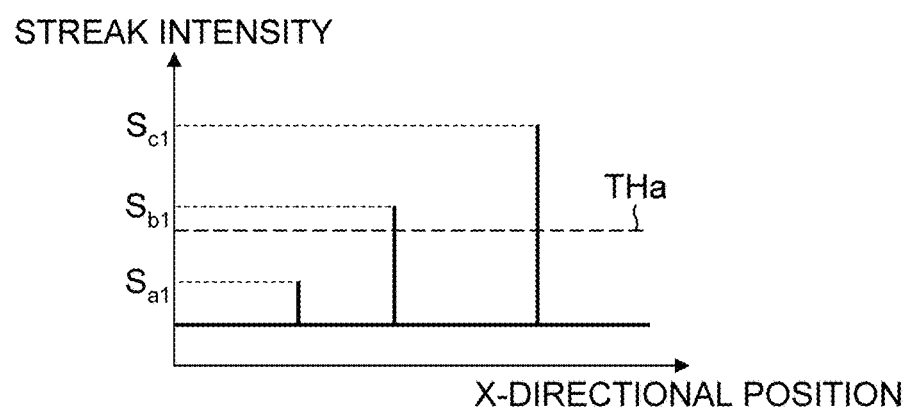

FIG. 5C is a diagram illustrating a streak strength profile calculated at the streak inspection processing unit 32 based on a read image obtained by reading the image 50 illustrated in FIG. 5A through the optical unit 26 having the CTF characteristic illustrated in FIG. 5B. In FIG. 5C, the horizontal axis represents the X directional position of the read image, and the vertical axis represents a streak strength (exemplary streak strength). The streak strength calculated at the streak inspection processing unit 32 has a larger value for a thicker and longer streak. In this example, the streak strength of the streak 52 is calculated to be $S_{a1}$, the streak strength of the streak 54 is calculated to be $S_{b1}$, and the streak strength of the streak 56 is calculated to be $S_{c1}$. FIG. 5C illustrates, with a dashed line, a streak inspection threshold $TH_a$ used to determine whether a streak is an allowable image defect based on the streak strength. This streak inspection threshold $TH_a$ is constant irrespective of the X directional position of the read image, in other words, the X directional position of the reading region of the optical unit 26.

In this example, the streak inspection processing unit 32 determines that the streak 52 is an allowable image defect because the streak strength $S_{a1}$ of the streak 52 is smaller than the streak inspection threshold $TH_a$. The streak inspection processing unit 32 determines that the streaks 54 and 56 are disallowable image defects because the streak strength $S_{b1}$ of the streak 54 and the streak strength $S_{c1}$ of the streak 56 are larger than the streak inspection threshold $TH_a$. The sheet 1 on which the image 50 including a streak determined as a disallowable image defect is printed is determined as a defect print piece. In this manner, the use of the optical unit 26 having the CTF characteristic illustrated in FIG. 5B enables appropriate execution of the streak inspection.

The following describes a case in which the CTF of the optical unit 26 for each divided reading region has a distribution. The image 50 illustrated in FIG. 6A is the same as the image 50 illustrated in FIG. 5A, in which the streak 52 as an allowable image defect and the streaks 54 and 56 as disallowable image defects are generated.

Figure 6A:
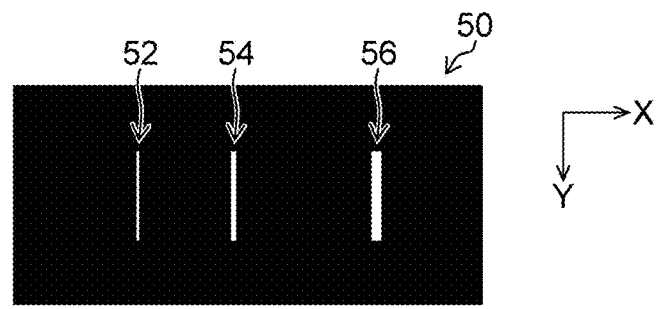
FIGS. 6A to 6C are diagrams for explaining the streak inspection when the CTF of each divided reading region of the optical unit has a distribution.
Figure 6B:
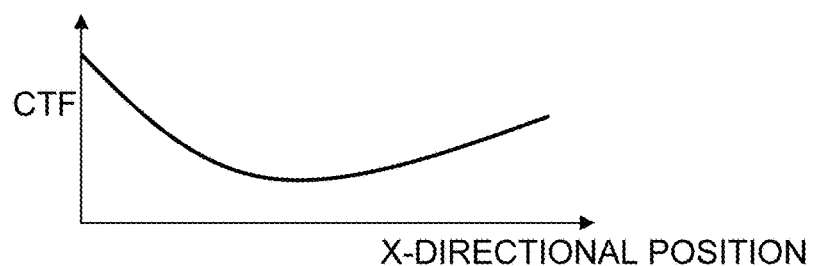

FIG. 6B is a diagram illustrating an exemplary CTF characteristic of the optical unit 26, in which the horizontal axis represents the X directional position of each divided reading region, and the vertical axis represents the CTF of the divided reading region. In this example, the CTF has such a distribution that the CTF is low in a central part of the X directional position as compared to that near both ends thereof.

Figure 6C:
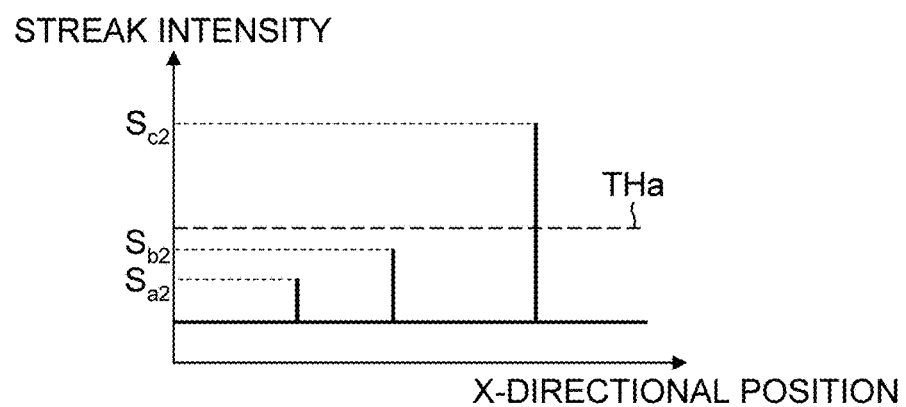

FIG. 6C is a diagram illustrating the streak strength profile calculated at the streak inspection processing unit 32 based on a read image obtained by reading the image 50 illustrated in FIG. 6A through the optical unit 26 having the CTF characteristic illustrated in FIG. 6B. In FIG. 6C, the horizontal axis represents the X directional position of the read image, and the vertical axis represents the streak strength. In this example, the streak strength of the streak 52 is calculated to be $S_{a2}$, the streak strength of the streak 54 is calculated to be $S_{b2}$, and the streak strength of the streak 56 is calculated to be $S_{c2}$.

The streak strength profile is affected by the CTF of the optical unit 26. Specifically, a low CTF leads to a small difference between pixel values in a background part (part other than streaks) of a read image (the image 50 in this example) and a streak part (the streaks 52, 54, and 56), so that the streak strength is calculated to be small. In this example, the CTF is lower than the CTF characteristic illustrated in FIG. 5B in the central part of the X directional position, and thus a relation "$S_{b2} < S_{b1}$" holds for the streak strength of the streak 54.

FIG. 6C illustrates the streak inspection threshold $TH_a$ with a dashed line. This streak inspection threshold $TH_a$ is constant irrespective of the X directional position of the read image. In this case, the streak inspection processing unit 32 determines that the streaks 52 and 54 are allowable image defects because the streak strength $S_{a2}$ of the streak 52 and the streak strength $S_{b2}$ of the streak 54 are smaller than the streak inspection threshold $TH_a$. The streak inspection processing unit 32 determines that the streak 56 is a disallowable image defect because the streak strength $S_{c2}$ of the streak 56 is larger than the streak inspection threshold $TH_a$.

Although the streak 54 generated in the image 50 should be determined as a disallowable image defect, the streak 54 is determined as an allowable image defect when the optical unit 26 having the CTF characteristic illustrated in FIG. 6B is used, so that the streak inspection cannot be appropriately performed. Thus, the streak inspection processing unit 32 in the present embodiment performs the streak inspection using the streak inspection threshold in accordance with the CTF characteristic as described below.

Figure 7A:
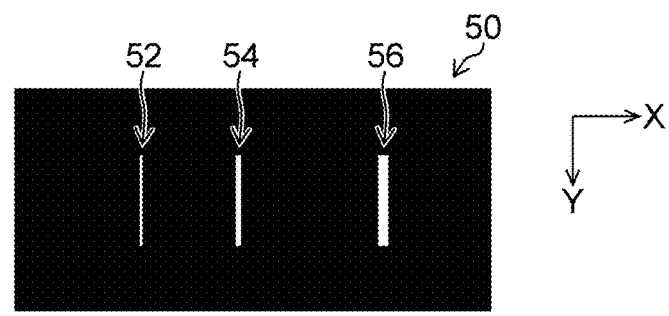
FIGS. 7A to 7C are diagrams for explaining the streak inspection in the present embodiment.

The image 50 illustrated in FIG. 7A is the same as the image 50 illustrated in FIG. 5A, in which the streak 52 as an allowable image defect and the streaks 54 and 56 as disallowable image defects are generated. In addition, the CTF characteristic of the optical unit 26 illustrated in FIG. 7B is the same as the CTF characteristic illustrated in FIG. 6B.

Figure 7B:
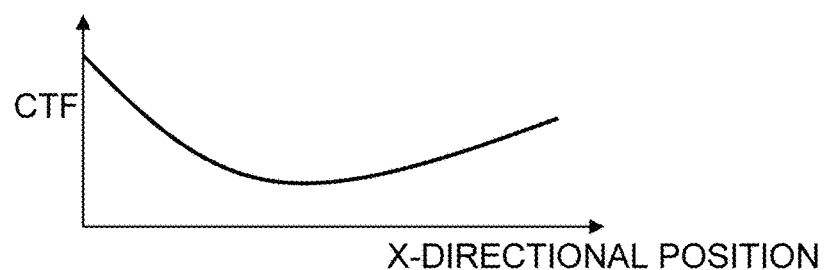
Figure 7C:
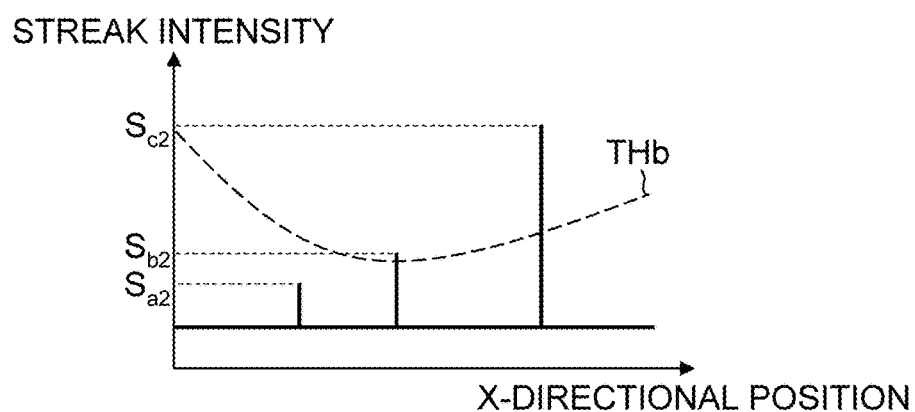

FIG. 7C is a diagram illustrating the streak strength profile calculated at the streak inspection processing unit 32 based on a read image obtained by reading the image 50 illustrated in FIG. 7A through the optical unit 26 having the CTF characteristic illustrated in FIG. 7B. Similarly to the example illustrated in FIG. 6C, the streak strength of the streak 52 is calculated to be $S_{a2}$, the streak strength of the streak 54 is calculated to be $S_{b2}$, and the streak strength of the streak 56 is calculated to be $S_{c2}$.

FIG. 7C illustrates the streak inspection threshold $TH_b$ with a dashed line. The streak inspection threshold $TH_b$ has a value in accordance with the CTF of the optical unit 26 for each divided reading region, and similarly to the distribution of the CTF, has such a distribution that the threshold is low in a central part as compared to that near both ends of the X directional position. In other words, the streak inspection threshold $TH_b$ is corrected to be lower for a divided reading region for which the CTF is lower. This streak inspection threshold $TH_b$ is calculated at the streak inspection processing unit 32 in accordance with the CTF characteristic of the optical unit 26.

The streak inspection processing unit 32 performs the streak inspection using the streak inspection threshold $TH_b$ in accordance with the CTF characteristic. Then, the streak inspection processing unit 32 determines that the streak 52 is an allowable image defect because the streak strength $S_{a2}$ of the streak 52 is smaller than the streak inspection threshold $TH_b$. The streak inspection processing unit 32 also determines that the streaks 54 and 56 are disallowable image defects because the streak strength $S_{b2}$ of the streak 54 and the streak strength $S_{c2}$ of the streak 56 are larger than the streak inspection threshold $TH_b$. In this manner, the use of the streak inspection threshold $TH_b$ in accordance with the CTF characteristic enables appropriate execution of the streak inspection, thereby achieving reduction in variation of the quality of printing across the sheet.

Printing-Position Shift Detection

The following describes the printing-position shift detection of recording elements by the examining apparatus 10. The printing-position shift detection reads a test pattern printed by the recording head, and analyzes a printing-position shift amount based on a read image so as to detect a recording element with a large printing-position shift amount as a defective element.

Figure 8:
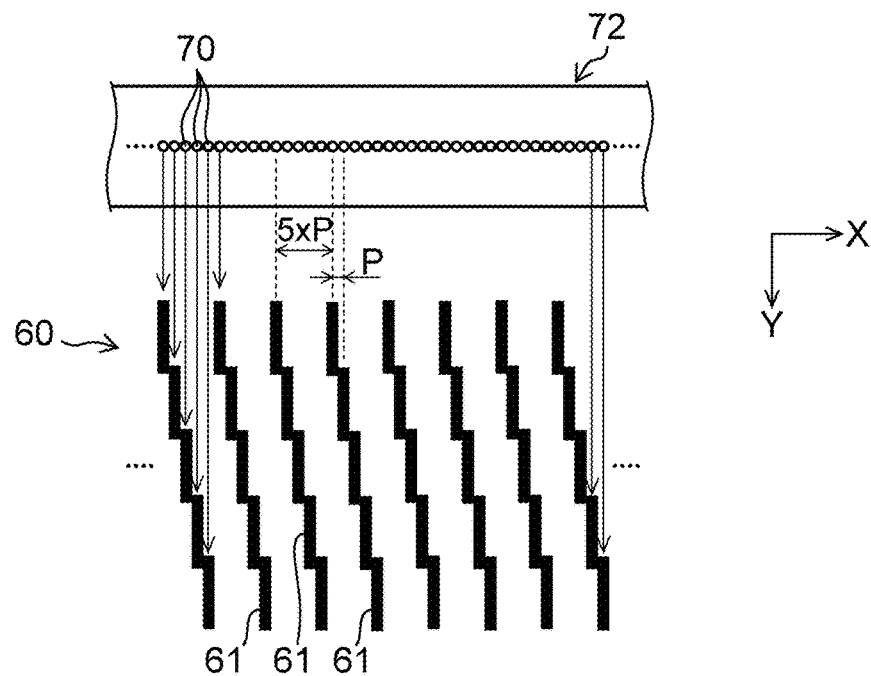
FIG. 8 is a diagram illustrating an exemplary ideal printing-position shift detection pattern.

FIG. 8 is a diagram illustrating an exemplary ideal printing-position shift detection pattern 60. The printing-position shift detection pattern 60 is a pattern to be printed by the recording head including a plurality of recording elements arranged at an interval P in the X direction, and includes a plurality of lines 61 in the Y direction. FIG. 8 illustrates, as an exemplary recording head that prints the printing-position shift detection pattern 60, a recording head 72 including a plurality of recording elements 70 arranged at the interval P in the X direction.

As illustrated in FIG. 8, in the printing-position shift detection pattern 60, n staged regions are arranged in the Y direction, each region including the lines 61 arranged at an interval n×P in the X direction. A position at which each line 61 is arranged is shifted by P in the X direction between the n staged regions (what is called a "1 on n off" pattern). This example illustrates a case with n=5 ("1 on 5 off" pattern). Such a printing-position shift detection pattern 60 is used to detect the printing-position shift amount of a recording element that has formed each line 61.

Figure 9:
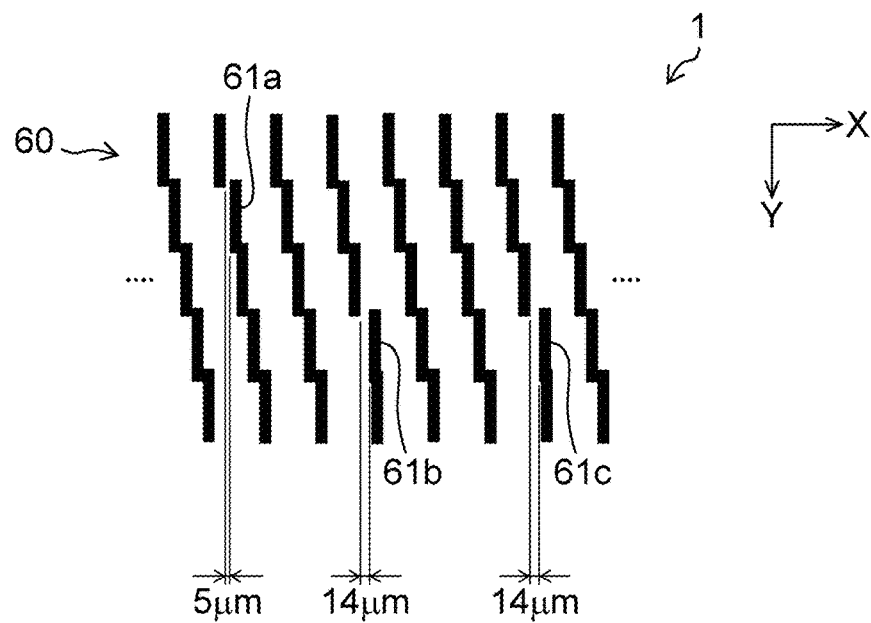
FIG. 9 is an exemplary printing-position shift detection pattern printed on a sheet.

FIG. 9 illustrates an exemplary printing-position shift detection pattern 60 printed on the sheet 1. In this example, a printing-position shift of 5 [μm] is generated at a line 61a, a printing-position shift of 14 [μm] is generated at a line 61b, and a printing-position shift of 14 [μm] is generated at a line 61c. With an allowable printing-position shift threshold of 13 [μm], the line 61a is an allowable printing-position shift, and the lines 61b and 61c are disallowable printing-position shifts. Thus, in the printing-position shift detection, a recording element that has recorded the line 61a can be determined as a non-defective element, and recording elements that have recorded the lines 61b and 61c can be determined as defective elements.

Figure 10A:
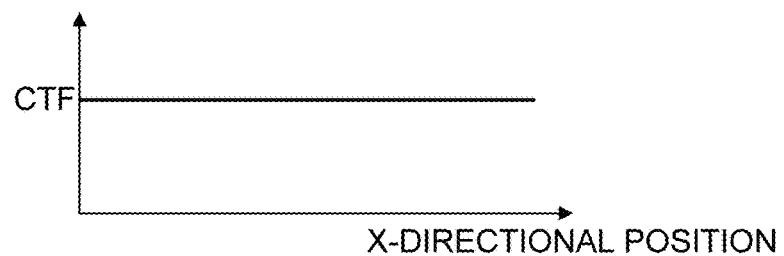
FIGS. 10A to 10C are diagrams for explaining printing-position shift detection.

FIG. 10A is a diagram illustrating an exemplary CTF characteristic of the optical unit 26, in which the horizontal axis represents the X directional position of each divided reading region, and the vertical axis represents the CTF of the divided reading region. In this example, the CTF is constant irrespective of the X directional position.

Figure 10B:
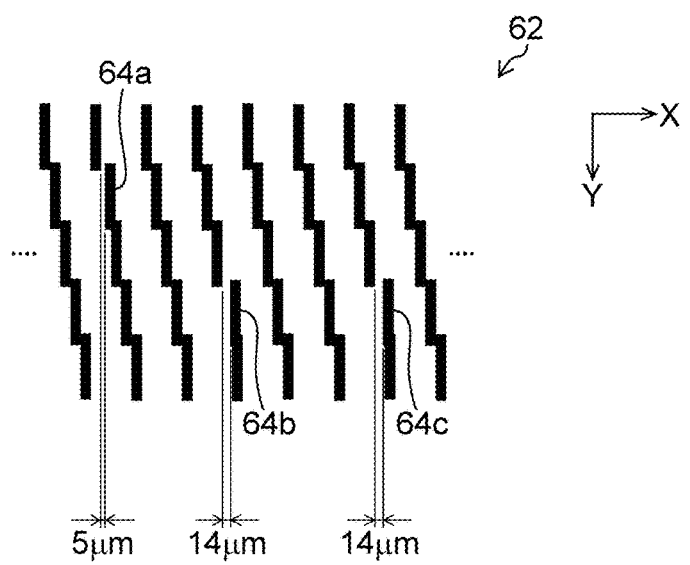

FIG. 10B illustrates an exemplary read image 62 obtained by reading the printing-position shift detection pattern 60 illustrated in FIG. 9 through the optical unit 26 having the CTF characteristic illustrated in FIG. 10A. In FIG. 10B, lines 64a, 64b, and 64c in the read image 62 correspond to the lines 61a, 61b, and 61c of the printing-position shift detection pattern 60, respectively.

Figure 10C:
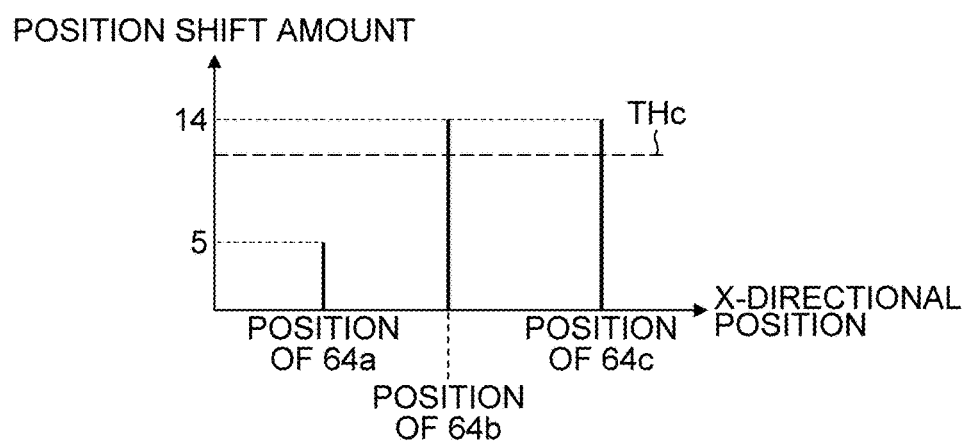

FIG. 10C is a diagram illustrating a printing-position shift profile calculated at the printing-position shift detection processing unit 33 based on the read image 62 illustrated in FIG. 10B. In FIG. 10C, the horizontal axis represents the X directional position of the read image, and the vertical axis represents the printing-position shift amount. As illustrated in FIG. 10C, the printing-position shift amount is calculated to be, 5 [μm] for the line 64a, 14 [μm] for the line 64b, and 14 [μm] for the line 64c, which are accurate calculation results.

FIG. 10C illustrates, with a dashed line, a printing-position shift detection threshold $TH_c$ for determining whether the generated printing-position shift amount is an allowable printing-position shift amount. This printing-position shift detection threshold $TH_c$ is constant (13 [μm]) irrespective of the X directional position of the read image, in other words, the X directional position of the reading region of the optical unit 26.

In this example, the printing-position shift detection processing unit 33 determines a recording element that has printed the line 61a as a non-defective element because the printing-position shift amount of the line 64a is smaller than the printing-position shift detection threshold $TH_c$. In addition, the printing-position shift detection processing unit 33 detects recording elements that have printed the lines 61b and 61c as defective elements because the printing-position shift amounts of the lines 64b and 64c are larger than the printing-position shift detection threshold $TH_c$. In this manner, used of the optical unit 26 having the CTF characteristic illustrated in FIG. 10A enables appropriate execution of the printing-position shift detection.

Figure 11A:
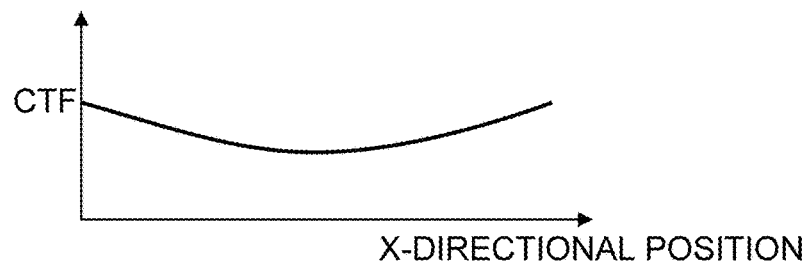
FIGS. 11A to 11C are diagrams for explaining the printing-position shift detection when a CTF of each region of the optical unit has a distribution.

The following describes a case in which the CTF of the optical unit 26 for each divided reading region has a distribution. FIG. 11A is a diagram illustrating an exemplary CTF characteristic of the optical unit 26, in which the horizontal axis represents the X directional position of each divided reading region, and the vertical axis represents the CTF of the divided reading region. In this example, the CTF has such a distribution that the CTF is low in a central part as compared to that near both ends of the X directional position.

Figure 11B:
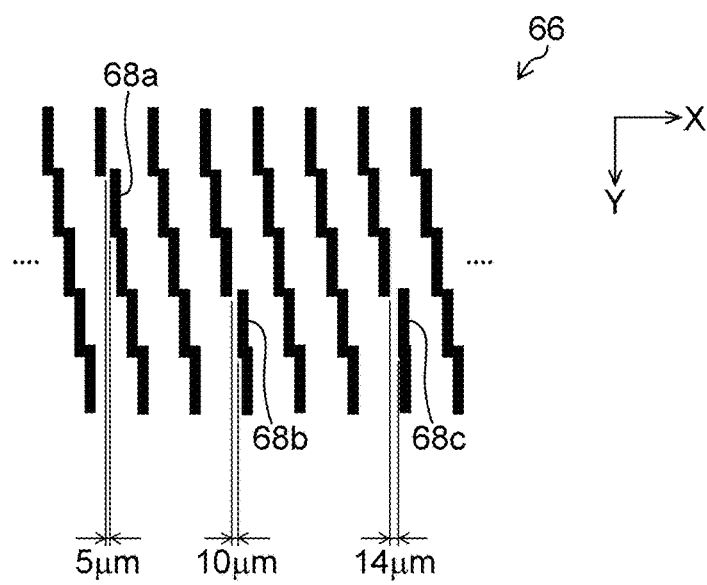

FIG. 11B illustrates an exemplary read image 66 obtained by reading the printing-position shift detection pattern 60 illustrated in FIG. 9 through the optical unit 26 having the CTF characteristic illustrated in FIG. 11A. In FIG. 11B, lines 68a, 68b, and 68c in the read image 66 correspond to the lines 61a, 61b, and 61c of the printing-position shift detection pattern 60, respectively.

Figure 11C:
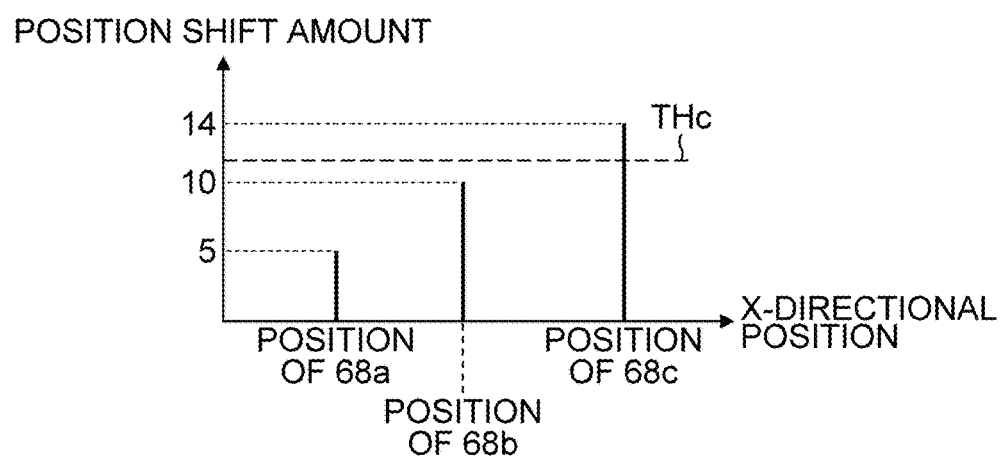

FIG. 11C is a diagram illustrating a printing-position shift profile calculated at the printing-position shift detection processing unit 33 based on the read image 66 illustrated in FIG. 11B. In FIG. 11C, the horizontal axis represents the X directional position of the read image, and the vertical axis represents the printing-position shift amount. As illustrated in FIG. 11C, the printing-position shift amount is calculated to be 5 [µm] for the line 68a, 10 [µm] for the line 68b, and 14 [µm] for the line 68c, indicating undervaluation of the printing-position shift amount of the line 61b. This is because a low CTF blurs the position of a line in a read image.

FIG. 11C illustrates, with a dashed line, the printing-position shift detection threshold $TH_c$ for determining whether the generated printing-position shift amount is an allowable printing-position shift amount. This printing-position shift detection threshold $TH_c$ is constant (13 [µm]) irrespective of the X directional position of the read image, in other words, the X directional position of the reading region of the optical unit 26.

In this example, the printing-position shift detection processing unit 33 determines that recording elements that have printed the lines 61a and 61b as non-defective elements because the printing-position shift amounts of the lines 68a and 68b are smaller than the printing-position shift detection threshold $TH_c$. In addition, the printing-position shift detection processing unit 33 detects a recording element that has printed the line 61c as a defective element because the printing-position shift amount of the line 68c is larger than the printing-position shift detection threshold $TH_c$.

In this manner, when the optical unit 26 having the CTF characteristic illustrated in FIG. 11A is used, a recording element that has printed the line 61b for which a disallowable printing-position shift is generated is determined as a non-defective element, so that the printing-position shift detection is not appropriately executed. Thus, the printing-position shift detection processing unit 33 in the present embodiment performs the streak inspection using the printing-position shift detection threshold in accordance with the CTF characteristic as described below.

Figure 12A:
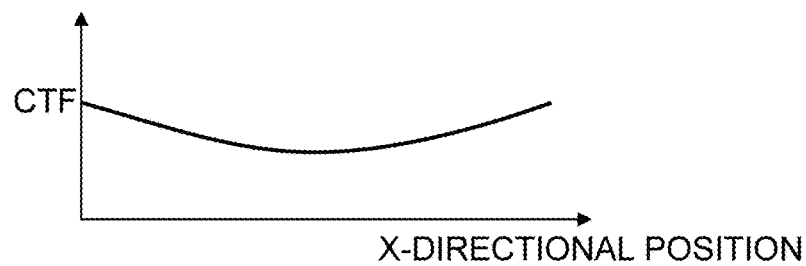
FIGS. 12A to 12C are diagrams for explaining the printing-position shift detection in the present embodiment.
Figure 12B:
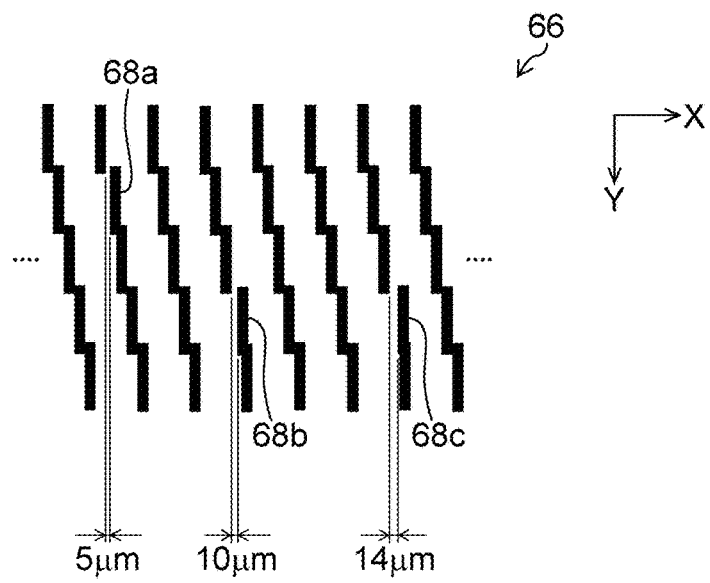

The CTF characteristic of the optical unit 26 illustrated in FIG. 12A is the same as the CTF characteristic illustrated in FIG. 11A, and the read image 66 illustrated in FIG. 12B is the same as the read image 66 illustrated in FIG. 11B.

Figure 12C:
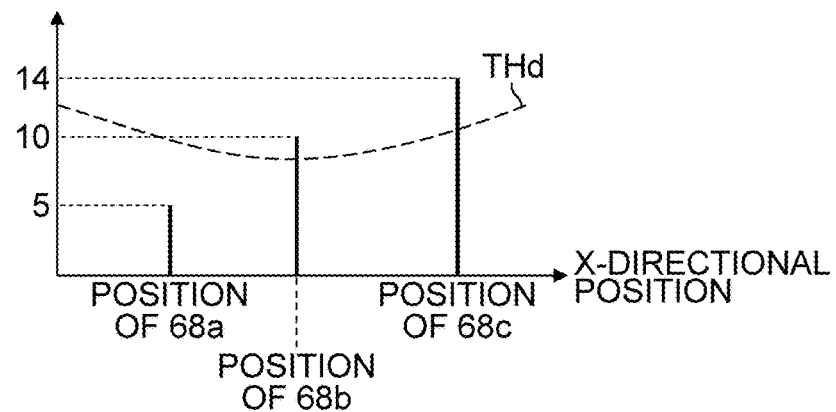

FIG. 12C is a diagram illustrating a printing-position shift profile calculated at the printing-position shift detection processing unit 33 based on the read image 66 illustrated in FIG. 12B. Similarly to FIG. 11C, the printing-position shift amount is calculated to be 5 [µm] for the line 68a, 10 [µm] for the line 68b, and 14 [µm] for the line 68c.

FIG. 12C illustrates a printing-position shift detection threshold $TH_d$ with a dashed line. The printing-position shift detection threshold $TH_d$ has a value in accordance with the CTF of the optical unit 26 for each divided reading region, and similarly to the distribution of the CTF, has such a distribution that the threshold is low in a central part as compared to that near both ends of the X directional position. In other words, the printing-position shift detection threshold $TH_d$ is corrected to be lower for a divided reading region for which the CTF is lower. This printing-position shift detection threshold $TH_d$ is calculated at the printing-position shift detection processing unit 33 in accordance with the CTF characteristic of the optical unit 26.

In this example, the printing-position shift detection processing unit 33 determines a recording element that has printed the line 61a as a non-defective element because the printing-position shift amount of the line 68a is smaller than the printing-position shift detection threshold $TH_d$. In addition, the printing-position shift detection processing unit 33 detects recording elements that have printed the lines 61b and 61c as defective elements because the printing-position shift amounts of the lines 68b and 68c are larger than the printing-position shift detection threshold $TH_d$. In this manner, the use of the printing-position shift detection threshold $TH_d$ in accordance with the CTF characteristic enables appropriate execution of the printing-position shift detection, thereby achieving reduction in variation of the quality of printing across the sheet.

Examining Method

Figure 13:
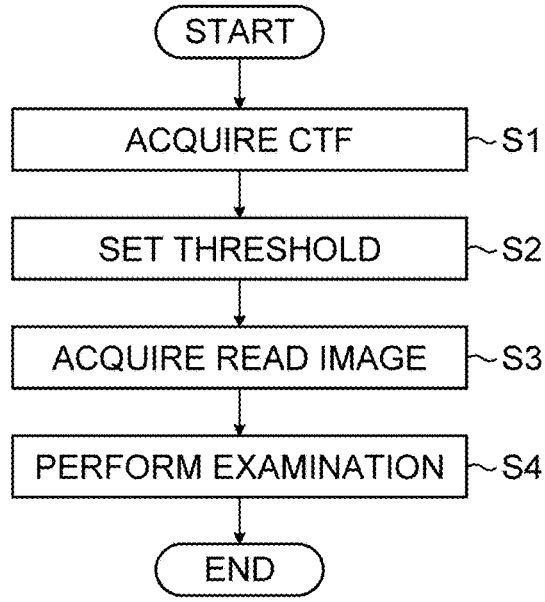
FIG. 13 is a flowchart illustrating a process of an examining method.

An examining method (exemplary image examining method) of the streak inspection and the printing-position shift detection in the examining apparatus 10 will be described below with reference to a flowchart illustrated in FIG. 13.

First, the reading region of the optical unit 26 is divided into a plurality of regions, and the CTF of each divided reading region is acquired (step S1; exemplary index acquiring step). The CTF of each divided reading region can be calculated by, for example, analyzing a read image obtained by reading the reference chart 40 illustrated in FIG. 4.

Next, the streak inspection threshold and the printing-position shift detection threshold are corrected for each divided reading region in accordance with the CTF of the divided reading region (step S2; exemplary correcting step).

Subsequently, a read image is acquired by reading a print image through the optical unit 26 (step S3; exemplary reading step).

Finally, the state of the read image is analyzed by using the streak inspection threshold and the printing-position shift detection threshold corrected for each divided reading region, so as to perform the streak inspection and the printing-position shift detection (step S4; exemplary analyzing step).

The streak inspection threshold and the printing-position shift detection threshold for each divided reading region are set to small values for a divided reading region with a large CTF (good contrast performance) and set to large values for a divided reading region with a small CTF (bad contrast performance), thereby achieving appropriate execution of the streak inspection and the printing-position shift detection irrespective of the CTF.

The above-described examining method may be configured as a program including an index acquiring function, a correcting function, a reading function, and an analyzing function that cause a computer to execute the respective processes of the index acquiring step, the correcting step, the reading step, and the analyzing step. This program may be stored in a non-transitory recording medium such as a Compact Disk-Read Only Memory (CD-ROM).

Other Embodiments of Reading Apparatus

Figure 14:
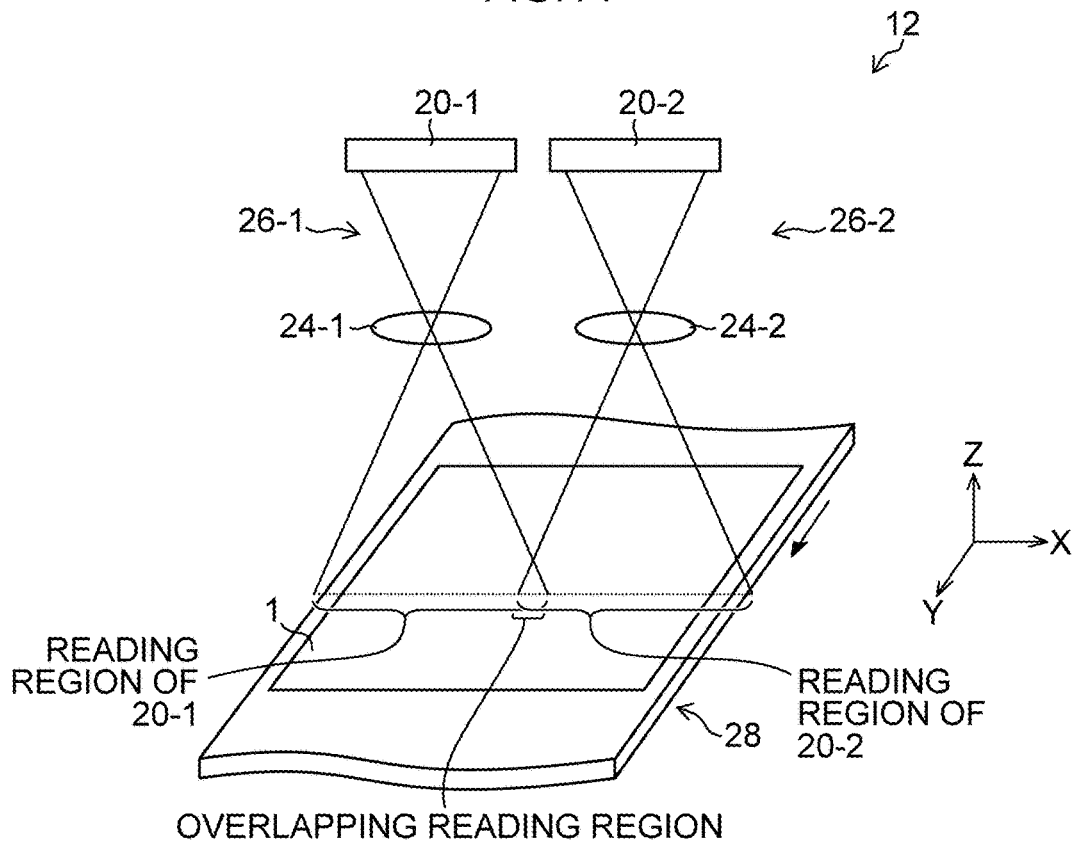
FIG. 14 is a schematic exterior diagram of an examining apparatus including a plurality of optical units.

The following describes an examining apparatus including a plurality of optical units with reference to FIG. 14. An identical reference numeral denotes any part common to the examining apparatus 10 illustrated in FIGS. 1 and 2, and a detailed description thereof is omitted. As illustrated in FIG. 14, an examining apparatus 12 includes line sensors 20-1 and 20-2, lens units 24-1 and 24-2, and the conveying unit 28.

Similarly to the examining apparatus 10 illustrated in FIG. 1, in the examining apparatus 12, the sheet 1 is conveyed in the conveyance direction by the conveying unit 28 while the recording surface thereof faces in the vertically upward direction.

The line sensors 20-1 and 20-2 are arranged in the X direction on the conveyance path above the sheet 1 in the vertically upward direction. The line sensors 20-1 and 20-2 each have the same configuration as the configuration of the line sensor 20 illustrated in FIG. 1. The lens unit 24-1 is provided between the conveyance path of the sheet 1 and the line sensor 20-1, and similarly, the lens unit 24-2 is provided between the conveyance path of the sheet 1 and the line sensor 20-2. The line sensor 20-1 and the lens unit 24-1 constitute an optical unit 26-1, and the line sensor 20-2 and the lens unit 24-2 constitute an optical unit 26-2. The lens units 24-1 and 24-2 have the same configuration as the configuration of the lens unit 24 illustrated in FIG. 1. The lens units 24-1 and 24-2 focus on the recording surface of the sheet 1 to image reading regions of the line sensors 20-1 and 20-2 onto image capturing elements (not illustrated in FIG. 14).

The reading regions of the line sensors 20-1 and 20-2 include the entire length of the sheet 1 in the X direction so that the examining apparatus 12 can read the entire sheet 1 in the X direction. The reading regions of the line sensors 20-1 and 20-2 each include an overlapping reading region in which these regions overlap with each other.

Figure 15:
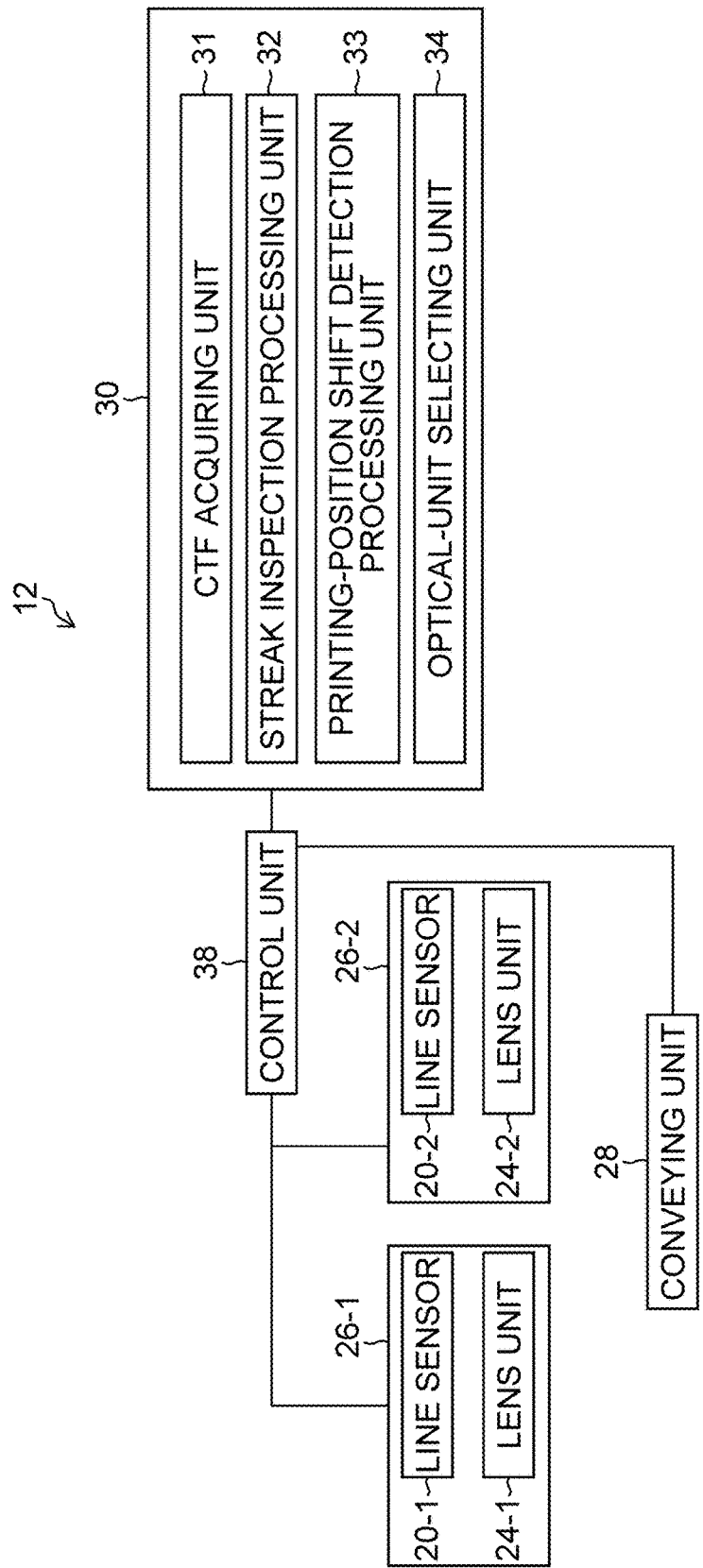
FIG. 15 is a functional block diagram of an examining apparatus including a plurality of optical units.

As illustrated in FIG. 15, the examining apparatus 12 includes an optical-unit selecting unit 34 in the image processing unit 30. The CTF characteristics of the optical units 26-1 and 26-2 vary in some cases due to, for example, variation in manufacturing of the lens units 24-1 and 24-2 and variation in assembly of the line sensors 20-1 and 20-2. Thus, the optical-unit selecting unit 34 (exemplary selecting device) selects which one of read images of the optical units 26-1 and 26-2 is used to perform, for the overlapping reading region, correction of the streak inspection threshold and the printing-position shift detection threshold, and processing of the streak inspection and the printing-position shift detection.

The examining apparatus 12 configured in this manner operates as described below. First, the conveying unit 28 conveys the sheet 1 in the conveyance direction. The optical units 26-1 and 26-2 output the read images of the respective reading regions. The control unit 38 controls the image processing unit 30 based on these read images so as to perform processing including the acquisition of the CTF of the optical unit 26, the streak inspection, and the position shift determination. Specifically, correction of the streak inspection threshold and the printing-position shift detection threshold and processing of the streak inspection and the printing-position shift detection are performed for the overlapping reading region based on the read image of the optical unit selected at the optical-unit selecting unit 34.

Selection of Optical Unit for Overlapping Reading Region

Figure 16:
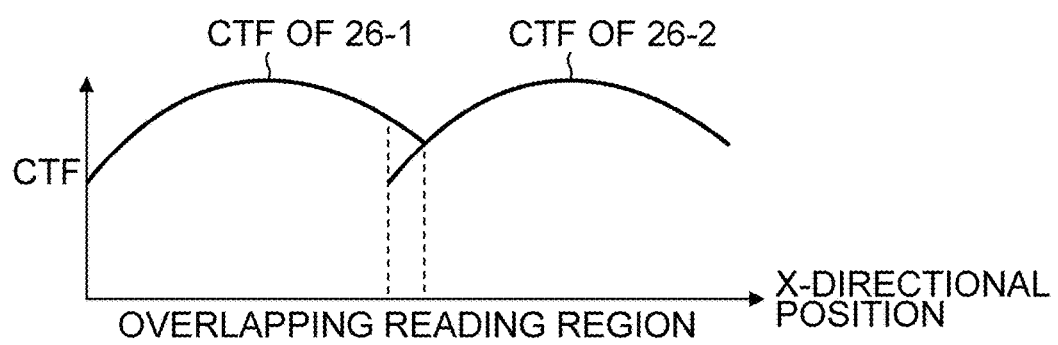
FIG. 16 is a diagram illustrating CTF characteristics of a plurality of optical units.

The selection by the optical-unit selecting unit 34 will be described in detail below. FIG. 16 is a diagram illustrating exemplary CTF characteristics of the optical units 26-1 and 26-2, in which the horizontal axis represents the X directional position of each divided reading region, and the vertical axis represents the CTF of the divided reading region. These CTF characteristics are acquired at the CTF acquiring unit 31 based on the read image of the reference chart 40. In this example, the CTFs of the optical units 26-1 and 26-2 each have such a distribution that the CTF is higher in a central part as compared to that near both ends of the X directional position.

The optical-unit selecting unit 34 compares the CTF characteristic of the optical unit 26-1 and the CTF characteristic of the optical unit 26-2 so as to select which of the read images of the line sensors is to be used for the overlapping reading region. In the present embodiment, the optical-unit selecting unit 34 employs a line sensor the CTF of which is higher in the overlapping reading region. In other words, the optical unit 26-1 is selected in the example illustrated in FIG. 16.

The control unit 38 employs the read image of the optical unit 26-1 as a read image of the overlapping reading region based on a result of the selection by the optical-unit selecting unit 34, and performs examination processing.

In this manner, the CTFs of two optical units are compared for the overlapping reading region, so that the read image of a line sensor the CTF of which is higher is used to achieve appropriate execution of the streak inspection and the printing-position shift detection.

The above describes the example in which the CTF of the optical unit 26-1 is higher in the entire overlapping reading region. However, when the overlapping reading region includes a divided reading region for which the CTF of the optical unit 26-1 is higher and a divided reading region for which the CTF of the optical unit 26-2 is higher, any one of the optical units may be employed for each divided reading region, or only one of the optical units may be employed based on evaluation of the average value of the CTFs or the minimum value thereof, for example.

Application to Ink-Jet Recording Apparatus

Figure 17:
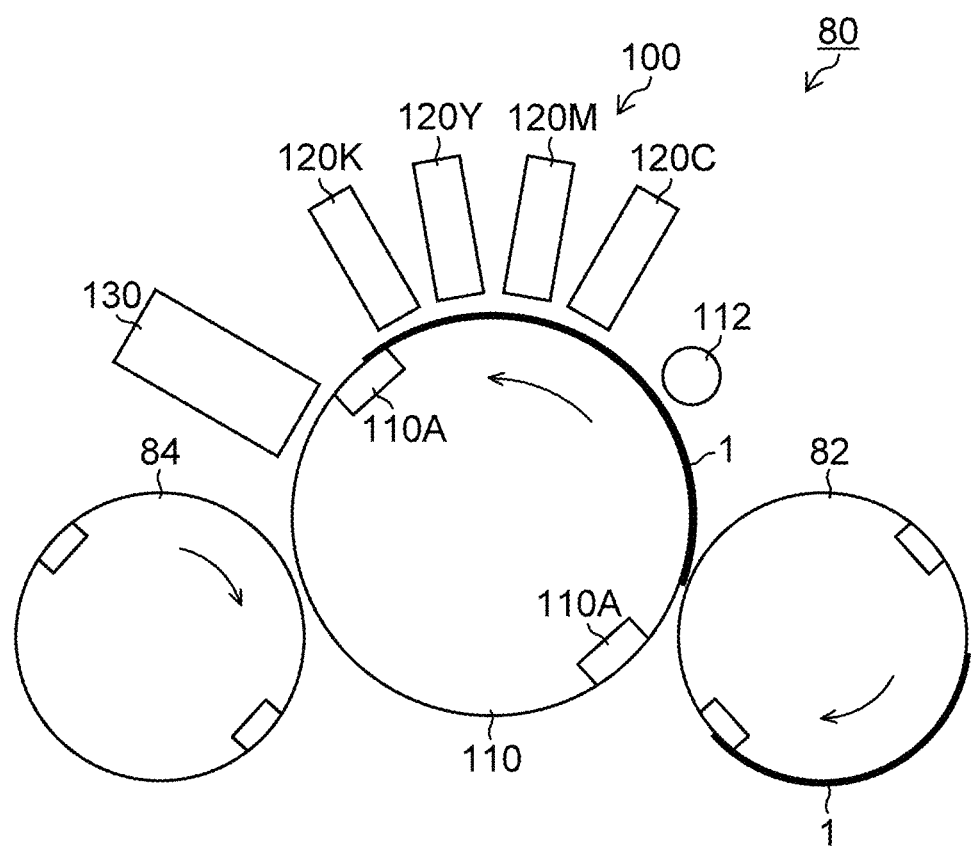
FIG. 17 is a diagram illustrating an entire configuration of an ink-jet recording apparatus according to an embodiment.

The following describes an ink-jet recording apparatus to which the examining apparatus 12 is applied. An ink-jet recording apparatus 80 (exemplary image recording apparatus) is a sheet-type water-based ink-jet printer that records an image on the sheet 1 with water-based ink through an ink-jet mechanism. As illustrated in FIG. 17, the ink-jet recording apparatus 80 includes a conveying drum 82 that conveys the sheet 1 fed mainly from a feeding unit (not illustrated), an image recording unit 100 that records an image on the recording surface of the sheet 1 passed from the conveying drum 82 with water-based ink through an ink-jet mechanism, and a conveying drum 84 that conveys the sheet 1 on which the image is recorded by the image recording unit 100 to a sheet ejecting unit (not illustrated).

The image recording unit 100 records a color image by applying an ink droplet of each color onto the recording surface of the sheet 1 while conveying the sheet 1. The image recording unit 100 includes an image recording drum 110 (exemplary conveying device) that conveys the sheet 1, a sheet pressing roller 112 that adheres the sheet 1 to a periphery of the image recording drum 110 by pressing the sheet 1 conveyed by the image recording drum 110, ink-jet heads (exemplary recording heads; hereinafter simply referred to as heads) 120C, 120M, 120Y, and 120K that eject ink droplets of the respective colors of cyan (C), magenta (M), yellow (Y), and black (K) onto the sheet 1, and an image capturing unit 130 that reads the image recorded on the sheet 1.

The image recording drum 110 is a device for conveying the sheet 1 in the image recording unit 100. The image recording drum 110 is a cylinder driven by a motor (not illustrated) to rotate about the center of the cylinder. A gripper 110A is provided on the outer circumferential surface of the image recording drum 110 so as to grip the head of the sheet 1. The image recording drum 110 grips the head of the sheet 1 through the gripper 110A and rotates the sheet 1 so that the sheet 1 is conveyed while being around the periphery the image recording drum 110.

The image recording drum 110 is provided with a large number of suction holes (not illustrated) formed in a predetermined pattern on the outer circumferential surface thereof. The sheet 1 around the periphery of the image recording drum 110 is sucked through the suction holes and conveyed while being adsorbed on the periphery of the image recording drum 110. In this manner, the sheet 1 can be conveyed highly smoothly.

The suction through the suction holes acts only in a region from a predetermined suction start position to a predetermined suction end position. The suction start position is set to, for example, the installation position of the sheet pressing roller 112, and the suction end position is set to, for example, a position at which the sheet is passed to the conveying drum 84. In other words, the region of the adsorption is set such that the sheet 1 is adsorbed on the outer circumferential surface of the image recording drum 110 at least at the positions of ink ejection by the heads 120C, 120M, 120Y, and 120K and the position of image reading by the image capturing unit 130. A mechanism that enables the adsorption of the sheet 1 onto the periphery of the image recording drum 110 is not limited to the above-described adsorbing method exploiting negative pressure, but a method exploiting electrostatic adsorption may be employed.

The image recording drum 110 according to the present embodiment is provided with the grippers 110A arranged at two positions on the outer circumferential surface thereof, and is configured such that the two sheets 1 can be conveyed through one rotation. Rotation of the conveying drum 82 and the image recording drum 110 is controlled so that the conveying drum 82 and the image recording drum 110 simultaneously perform receiving and passing of the sheet, respectively. Similarly, rotation of the image recording drum 110 and the conveying drum 84 is controlled so that the image recording drum 110 and the conveying drum 84 simultaneously perform receiving and passing of the sheet 1. In other words, the conveying drum 82, the image recording drum 110, and the conveying drum 84 are driven at the same circumferential speed so that the positions of grippers thereof coincide with each other.

The sheet pressing roller 112 is arranged near a sheet receiving position (position at which the sheet 1 is received from the conveying drum 82) of the image recording drum 110. The sheet pressing roller 112 is a rubber roller installed being pressed onto the periphery of the image recording drum 110. The sheet 1 passed from the conveying drum 82 to the image recording drum 110 is nipped through the sheet pressing roller 112 to adhere to the periphery of the image recording drum 110.

The four heads 120C, 120M, 120Y, and 120K are arranged at a constant interval along the path of conveyance of the sheet 1 by the image recording drum 110. The heads 120C, 120M, 120Y, and 120K each include a line head having a size corresponding to the width of the sheet. The heads 120C, 120M, 120Y, and 120K are arranged in a direction substantially orthogonal to the direction of conveyance of the sheet 1 by the image recording drum 110, and are arranged such that nozzle surfaces thereof face to the outer circumferential surface of the image recording drum 110. The heads 120C, 120M, 120Y, and 120K each ejects an ink droplet toward the image recording drum 110 from a nozzle array formed on the nozzle surface thereof so as to record an image, by a single pass method, on the recording surface of the sheet 1 conveyed by the image recording drum 110.

The image capturing unit 130 is an image capturing device that captures the image recorded on the recording surface of the sheet 1 by the heads 120C, 120M, 120Y, and 120K, and is installed downstream of the head 120K positioned at the end in the direction of conveyance of the sheet 1 by the image recording drum 110. In this example, the optical units 26-1 and 26-2 illustrated in FIG. 14 are used as the image capturing unit 130, the optical unit 26-1 being arranged on the back side in FIG. 17, and the optical unit 26-2 being arranged on the front side in FIG. 17. Image capturing elements (not illustrated) of the line sensors 20-1 and 20-2 each include 7400 pixels, and the reading regions of the line sensors include overlapping reading regions overlapping with each other. A pixel in the line sensor 20-1 is denoted by $PX_i$ (i=1, 2, . . . , 7400), and a pixel in the line sensor 20-2 is denoted by $PX_j$ (j=7401, 7402, . . . , 14800).

The image recording unit 100 configured as described above receives, at the image recording drum 110, the sheet 1 conveyed by the conveying drum 82. The image recording drum 110 grips the head of the sheet 1 with the gripper 110A and rotates the sheet 1 so as to convey the sheet 1. The sheet pressing roller 112 adheres the sheet 1 onto the periphery of the image recording drum 110. Simultaneously, the image recording drum 110 sucks the sheet 1 through the suction holes so as to adsorb the sheet 1 onto the outer circumferential surface of the image recording drum 110.

The heads 120C, 120M, 120Y, and 120K each record a color image on the recording surface of the sheet 1 by applying an ink droplet in each color of cyan, magenta, yellow, and black onto the recording surface of the sheet 1 when the sheet 1 passes an opposite position of the head.

The image capturing unit 130 reads the image recorded on the recording surface of the sheet 1 when the sheet 1 passes the opposite position of the image capturing unit 130. This reading of the record image is performed as necessary, so that processing such as the streak inspection and the printing-position shift detection is performed based on a read image. The reading is performed while the sheet 1 is being adsorbed onto the image recording drum 110, and thus can be performed highly accurately. The reading is performed right after the image is recorded, so that processing such as the streak inspection and the printing-position shift detection can be swiftly performed. This can prevent unnecessary recording and also can minimize the number of waste sheets.

Thereafter, the image recording drum 110 passes the sheet 1 to the conveying drum 84 after the suction of the sheet 1 is stopped.

Exemplary Configuration of Ink-Jet Head

The following describes the structure of an ink-jet head. The heads 120C, 120M, 120Y, and 120K corresponding to the respective colors has a common structure, and thus reference numeral 120 collectively denotes these heads in the following.

Figure 18:
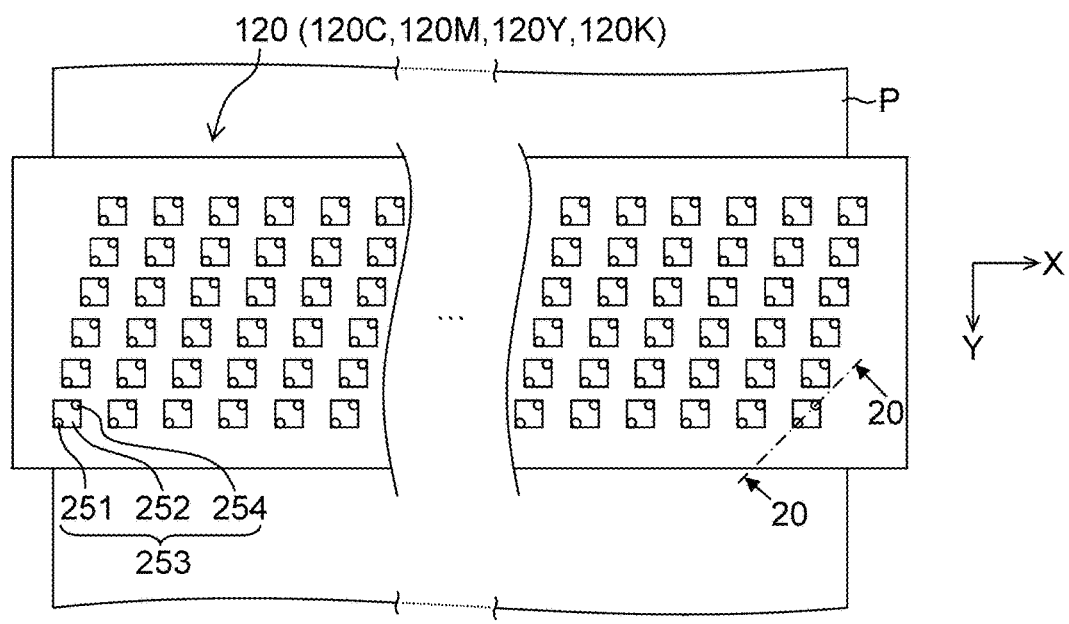
FIG. 18 is a plane perspective view illustrating an exemplary structure of an ink-jet head.
Figure 19:
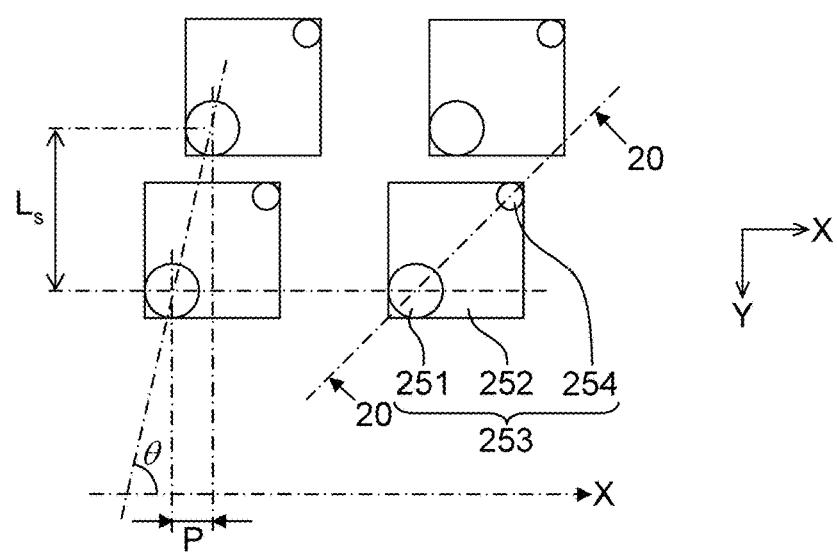
FIG. 19 is a partially enlarged view of FIG. 18.

As illustrated in FIGS. 18 and 19, the head 120 has the structure of a two-dimensional matrix of a plurality of ink chamber units (droplet ejection elements) 253 each including a nozzle 251 (exemplary recording element) as an ink ejection outlet and a pressure chamber 252 corresponding to each nozzle 251. This achieves a large reduction of an effective interval (projected nozzle pitch) of nozzles projected (orthographically projected) in a line along a direction (main scanning direction) orthogonal to the conveyance direction of the sheet 1.

The configuration that a nozzle array disposed in the main scanning direction has a length equal to or larger than the full width of a recording region of the sheet 1 is not limited to the present example. For example, lattices of arrays of shorter head modules each including a two-dimensionally array of a plurality of the nozzles 251 may be connected with each other to constitute a line head including a nozzle array having a length corresponding to the full width of the sheet 1. Alternatively, lines of the head modules may be connected with each other.

The record range is not limited to the entire surface of the sheet 1. When the recording region is a part of the surface of the sheet 1 (for example, when a non-recording region is provided at a peripheral part of the sheet 1), only a nozzle array necessary for recording in a predetermined recording region needs to be provided.

The pressure chamber 252 provided for each nozzle 251 has a substantially square shape in a plan view. An outlet to the nozzle 251 is provided at one of corners on a diagonal line of the square shape, and an inlet (supply inlet) 254 of supply ink is provided at the other corner. The shape of the pressure chamber 252 is not limited to this example, but the shape in a plan view may be any of various shapes such as a quadrangle (including a rhombus and a rectangle), a pentagon, a hexagon, any other polygon, a circle, and an ellipse.

Figure 20:
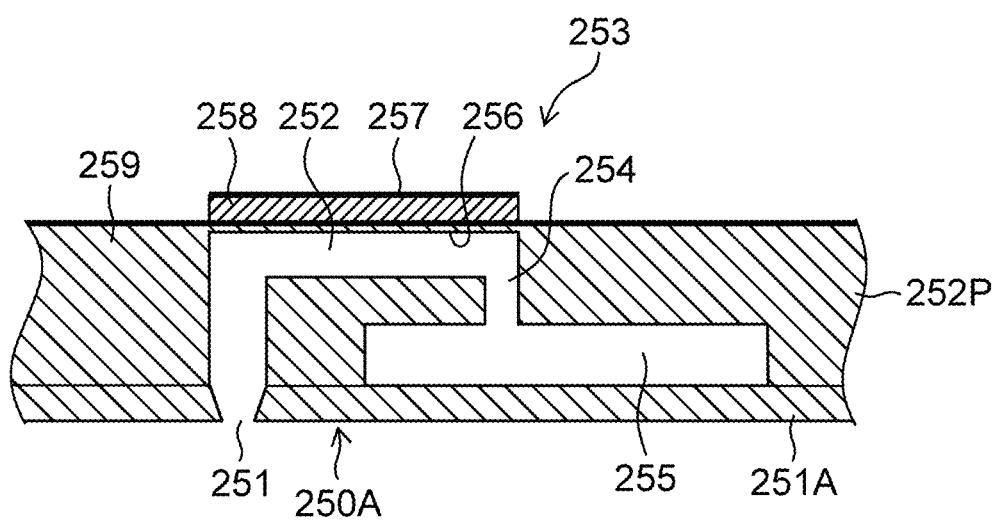
FIG. 20 is a sectional view taken along line 20-20 in FIGS. 18 and 19.

As illustrated in FIG. 20, the head 120 includes a bonded stack of a nozzle plate 251A in which the nozzle 251 is formed, and a flow path plate 252P in which the pressure chamber 252 and a flow path such as a common flow path 255 are formed. The nozzle plate 251A serves as a nozzle surface (ink ejecting surface) 250A of the head 120, in which a plurality of the nozzles 251 each communicating with the pressure chamber 252 are two-dimensionally formed.

The flow path plate 252P is a flow-path forming member serving as sidewalls of the pressure chamber 252 and forming the supply inlet 254 as a constriction (narrowest part) of an individual supply path that guides ink from the common flow path 255 to the pressure chamber 252. Although simply illustrated in FIG. 20 for the purpose of illustration, the flow path plate 252P is formed of a single board or a stack of a plurality of boards.

The nozzle plate 251A and the flow path plate 252P can be fabricated from silicon into desired shapes through a semiconductor manufacturing process.

The common flow path 255 is communicated with an ink tank (not illustrated) as an ink supply source. Ink supplied from the ink tank is supplied to each pressure chamber 252 through the common flow path 255.

A piezo actuator 258 provided with an individual electrode 257 is bonded on a vibrating plate 256 serving as a surface (top surface in FIG. 20) of the pressure chamber 252. The vibrating plate 256 in this example is made of silicon with a nickel conductive layer that functions as a common electrode 259 corresponding to a lower electrode of the piezo actuator 258, and also serves as a common electrode of the piezo actuator 258 arranged for each pressure chamber 252. The vibrating plate may be formed of a non-conductive material such as resin. In this case, a common electrode layer made of a conductive material such as a metal is formed on a surface of a vibrating plate member. Alternatively, the vibrating plate also serving as the common electrode may be made of a metal (conductive material) such as stainless steel.

Applying a drive voltage to the individual electrode 257 deforms the piezo actuator 258 to change the volume of the pressure chamber 252, so that a pressure change caused by this volume change ejects ink from the nozzle 251. When the piezo actuator 258 returns to its original form after the ink ejection, the pressure chamber 252 becomes refilled with new ink coming from the common flow path 255 though the supply inlet 254.

As illustrated in FIG. 19, a large number of the ink chamber units 253 each having such a structure are arrayed in a lattice of a constant array pattern in a row direction parallel to the main scanning direction and in a column direction tilted at a constant angle $\theta$ not orthogonal to the main scanning direction, thereby achieving the highly dense nozzle head according in this example. Such a matrix array can be effectively treated as an equivalent to a configuration in which the nozzles 251 are linearly arrayed at a constant pitch $P=L_s/\tan\theta$ in the main scanning direction where $L_s$ represents an interval between adjacent nozzles in the Y direction (conveyance direction of the sheet 1).

The array of the nozzles 251 in the head 120 according to the present invention is not limited to the illustrated example, but various nozzle arrangements are applicable. For example, a V-shaped nozzle array, or a nozzle array in a polygonal line such as a zigzag shape (W shape, for example) as repetition of the V-shaped array is applicable in place of the matrix array illustrated in FIG. 18.

A device that generates ejection pressure (ejection energy) for ejecting a droplet from each nozzle included in the ink-jet head is not limited to a piezo actuator (piezoelectric element). Various pressure generating elements (energy generating elements) such as a heater (heating element) in a thermal method (method of ejecting ink using the pressure of film boiling due to heating by the heater) and various actuators in other methods are applicable. A flow path structure is provided with a necessary energy generating element in accordance with an ejection method employed at the head.

Configuration of Control System

Figure 21:
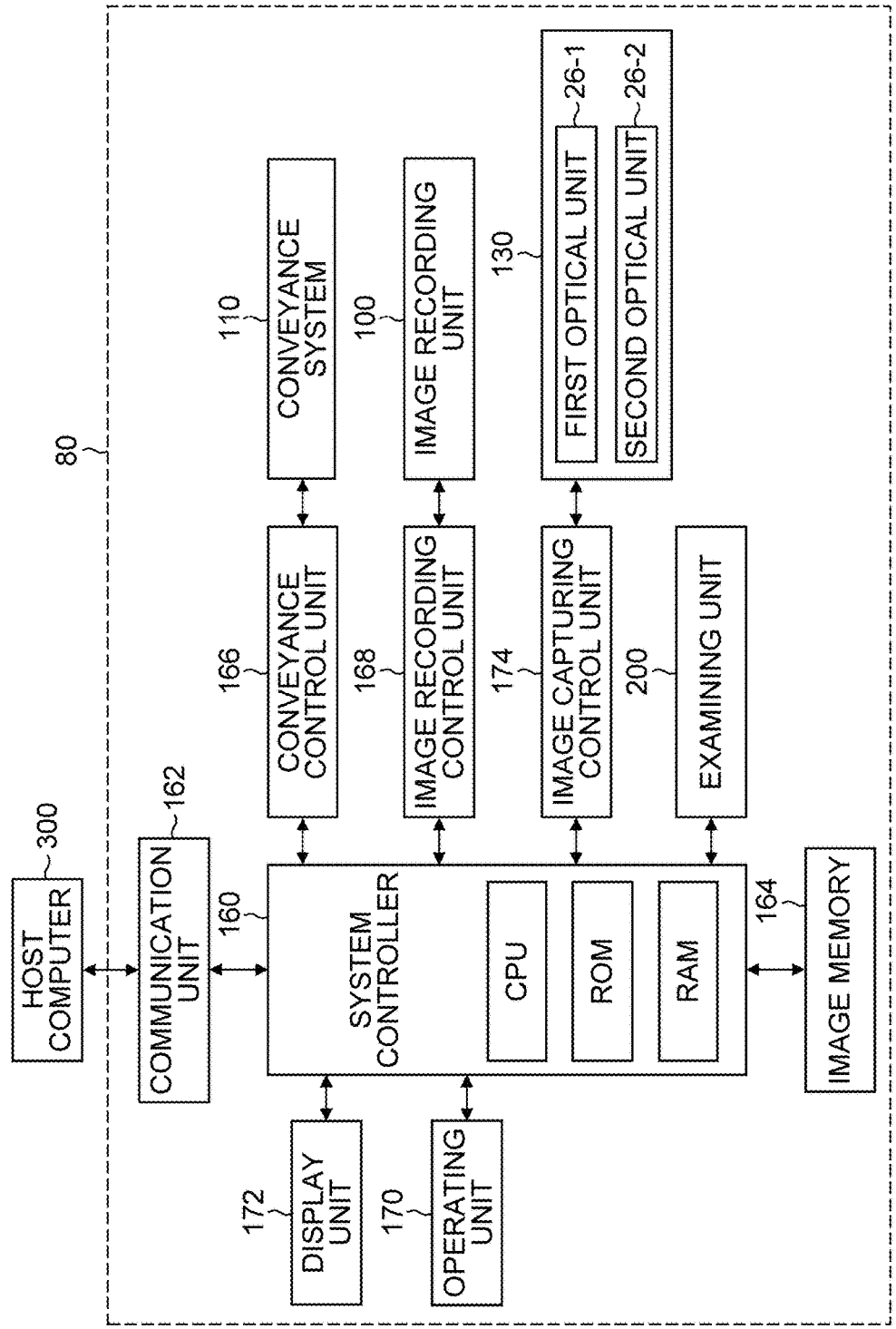
FIG. 21 is a block diagram illustrating a control system of the ink-jet recording apparatus.

As illustrated in FIG. 21, the ink-jet recording apparatus 80 includes a system controller 160, a communication unit 162, an image memory 164, a conveyance control unit 166, an image recording control unit 168, an operating unit 170, a display unit 172, an image capturing control unit 174, and an examining unit 200.

The system controller 160 functions as a control unit that performs overall control of components of the ink-jet recording apparatus 80, and also functions as a calculation device that performs various kinds of arithmetic processing. The system controller 160 includes a central processing unit (CPU), a read only memory (ROM), and a random access memory (RAM), and operates in accordance with a predetermined control program. The ROM stores a control program to be executed by the system controller 160 and various kinds of data necessary for controlling.

The communication unit 162 includes a necessary communication interface and communicates data with a host computer 300 connected with this communication interface.

The image memory 164 functions as a temporary storage device for various kinds of data including image data, and the data is written to and read from the image memory 164 through the system controller 160. Image data taken in from the host computer 300 through the communication unit 162 is stored in the image memory 164.

The conveyance control unit 166 controls a conveyance system of the sheet 1 in the ink-jet recording apparatus 80. Specifically, the conveyance control unit 166 controls drive of the image recording drum 110, the conveying drum 82, and the conveying drum 84 in the image recording unit 100.

The conveyance control unit 166 controls the conveyance system in accordance with a command from the system controller 160 so that the sheet 1 is conveyed smoothly.

The image recording control unit 168 controls the image recording unit 100 in accordance with a command from the system controller 160. Specifically, the image recording control unit 168 controls drive of the heads 120C, 120M, 120Y, and 120K (refer to FIG. 17) so that a predetermined image is recorded on the sheet 1 conveyed by the image recording drum 110.

The operating unit 170 is an input device including an operation button, a keyboard, and a touch panel. A user can input a printing job to the ink-jet recording apparatus 80 through the operating unit 170. The printing job is a set of pieces of processing for printing based on image data. The operating unit 170 outputs the input printing job to the system controller 160, and the system controller 160 executes various kinds of processing in accordance with the printing job input from the operating unit 170.

The display unit 172 includes a display apparatus such as a liquid crystal display (LCD) panel, and displays desired information on the display apparatus in accordance with a command from the system controller 160. The display unit 172 may also function as the display unit 36 (refer to FIG. 3).

The image capturing control unit 174 controls the image capturing unit 130 in accordance with a command from the system controller 160. Specifically, the image capturing control unit 174 controls the image capturing unit 130 to read an image recorded on the recording surface of the sheet 1 conveyed by the image recording drum 110, and acquires the read image.

The examining unit 200 (exemplary analyzing device, exemplary index acquiring device, exemplary correcting device) corresponds to the image processing unit 30 illustrated in FIG. 3, and acquires the read image of the image capturing unit 130 in accordance with a command from the system controller 160 to perform processing such as the CTF acquisition, the streak inspection, and the printing-position shift detection. The image recording drum 110, the image capturing unit 130, and the examining unit 200 can constitute the examining apparatus 12.

Image data recorded on the sheet 1 is taken into the ink-jet recording apparatus 80 from the host computer 300 through the communication unit 162. This image data is stored in the image memory 164.

The system controller 160 provides desired signal processing to the image data stored in the image memory 164 so as to generate dot data. The image recording control unit 168 controls drive of the heads 120C, 120M, 120Y, and 120K of the image recording unit 100 in accordance with the generated dot data so as to record an image represented by the image data onto the recording surface of the sheet 1.

Typically, the dot data is generated through color conversion processing and halftone processing on the image data. The color conversion processing converts image data (for example, 8-bit RGB image data) expressed in, for example, sRGB into ink amount data of ink of each color used in the ink-jet recording apparatus 80 (in this example, the image data is converted into ink amount data of each color of C, M, Y, and K). The halftone processing performs processing such as error diffusion on the ink amount data of each color generated by the color conversion processing so as to convert the ink amount data into dot data of the color.

The system controller 160 performs the color conversion processing and the halftone processing on the image data so as to generate dot data of each color. Then, the system controller 160 records an image expressed by the image data onto the sheet 1 by controlling drive of each ink-jet head in accordance with the generated dot data of the corresponding color.

In addition, the system controller 160 controls the image capturing unit 130 to read the image recorded on the sheet, and controls the examining unit 200 to perform the CTF acquisition, the streak inspection, and the printing-position shift detection.

CTF Acquisition Using Non-Ejection Detecting Pattern

The ink-jet recording apparatus 80 prints (records) a non-ejection detecting pattern on the sheet 1 for each of the heads 120C, 120M, 120Y, and 120K. A read image of the printed non-ejection detecting pattern is used to detect, from among the nozzles 251, a nozzle (non-ejection nozzle) that cannot eject ink, and a nozzle (ejection misaligned nozzle) an ejection direction of which is misaligned.

Figure 22:
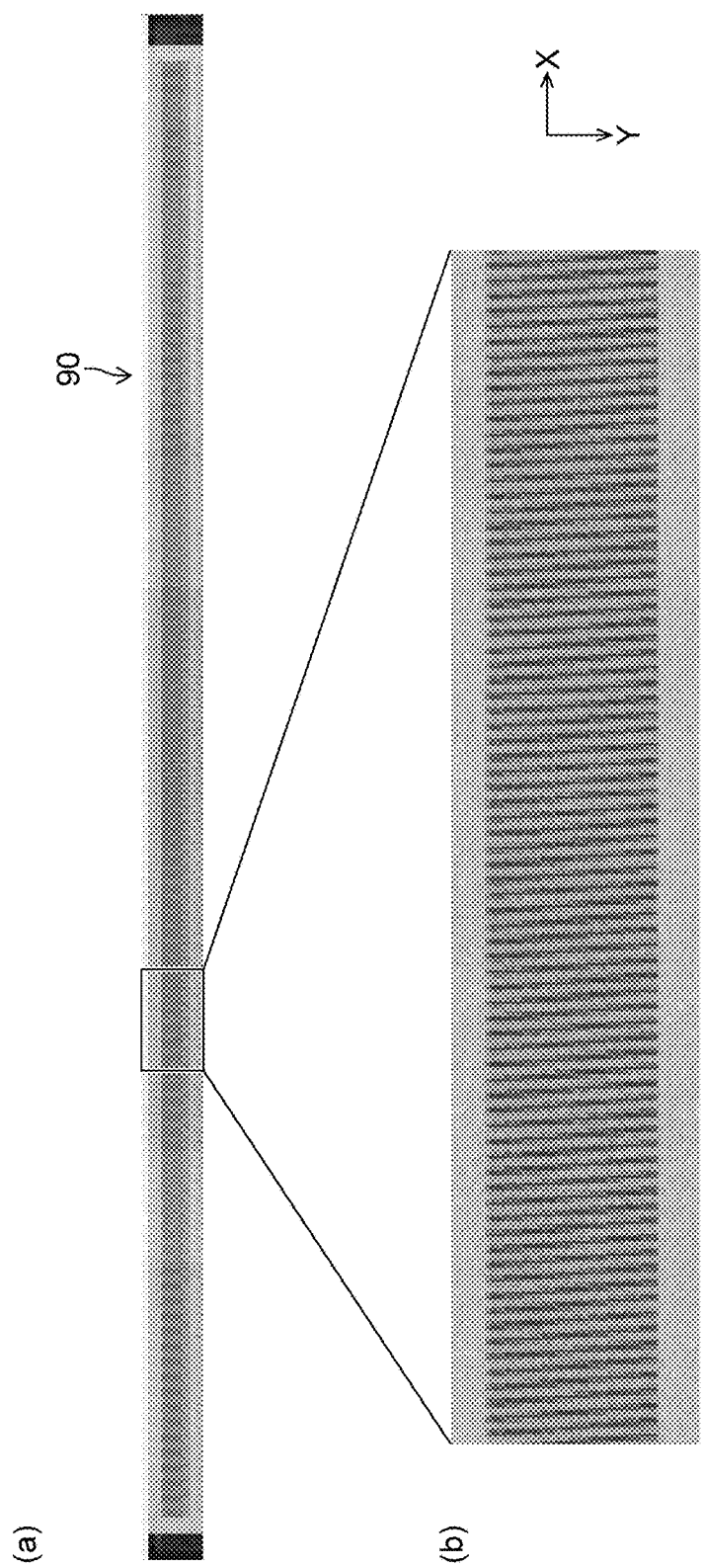
FIG. 22 is a diagram illustrating a non-ejection detecting pattern.

FIG. 22A is a diagram illustrating a non-ejection detecting pattern 90 for printing with a single head, and FIG. 22B is a partially enlarged view of the non-ejection detecting pattern 90. The non-ejection detecting pattern 90 is what is called a "1 on 10 off" pattern, and each nozzle 251 prints a line extending in the Y direction in the non-ejection detecting pattern 90.

The ink-jet recording apparatus 80 prints the non-ejection detecting pattern 90 on the sheet 1 conveyed by the image recording drum 110 at each of the heads 120C, 120M, 120Y, and 120K. Next, the image capturing unit 130 reads the non-ejection detecting pattern 90 to generate a read image. Then, the examining unit 200 analyzes the read image to detect any non-ejection nozzle or any ejection misaligned nozzle.

The examining unit 200 acquires the CTF of each divided reading region of the image capturing unit 130 based on the read image of the non-ejection detecting pattern 90. Each line in the non-ejection detecting pattern 90 is shifted in the X direction in some cases due to a printing-position shift (deposit position shift) of the nozzle 251. However, the CTF analysis in the present embodiment is performed for a region (region of 10 [mm] approximately in this example) of a certain width, and thus the deposit position shift, which is 20 [μm] approximately at maximum, has negligible influence.

Figure 23:
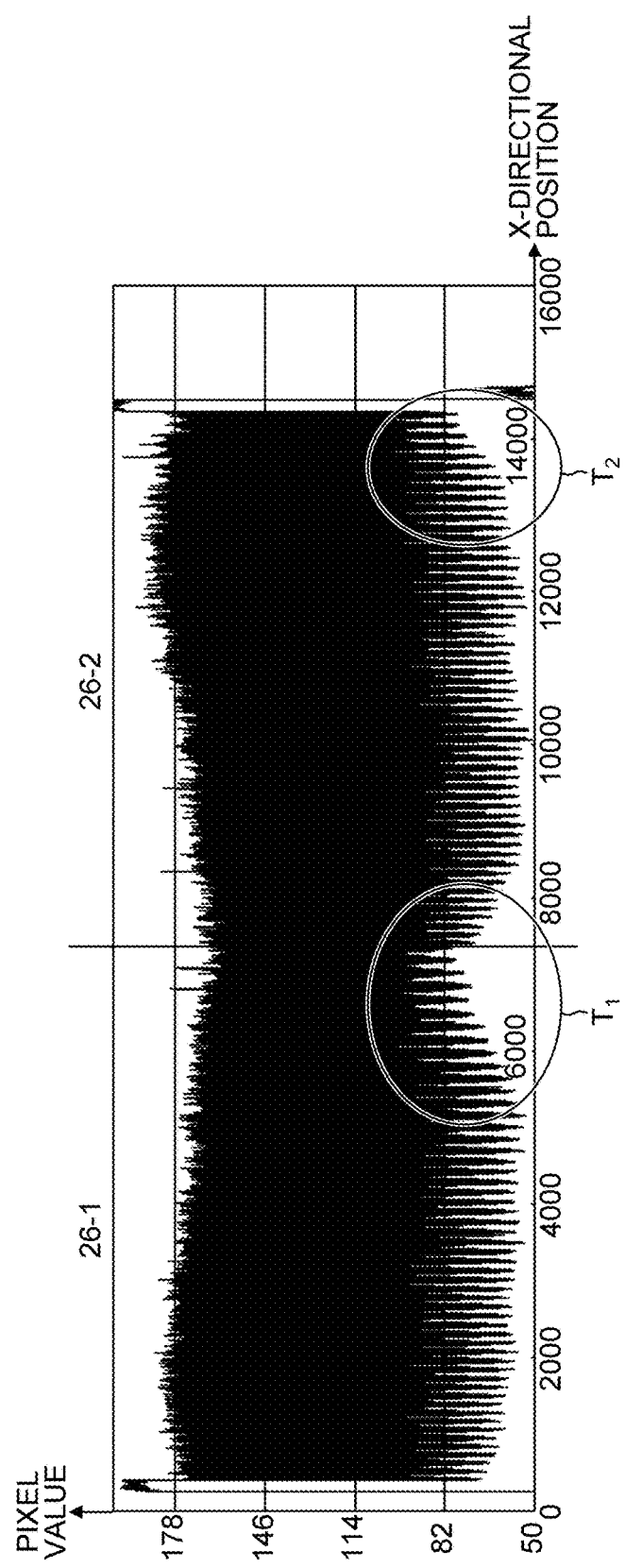
FIG. 23 is a diagram illustrating each pixel value in a read image of the non-ejection detecting pattern.

FIG. 23 is a diagram illustrating each pixel value of the image capturing elements (not illustrated) of the optical units 26-1 and 26-2 acquired from the read image of the non-ejection detecting pattern 90. FIG. 23 illustrates the pixel value of the read image for one of staged regions of the non-ejection detecting pattern 90.

Figure 24:
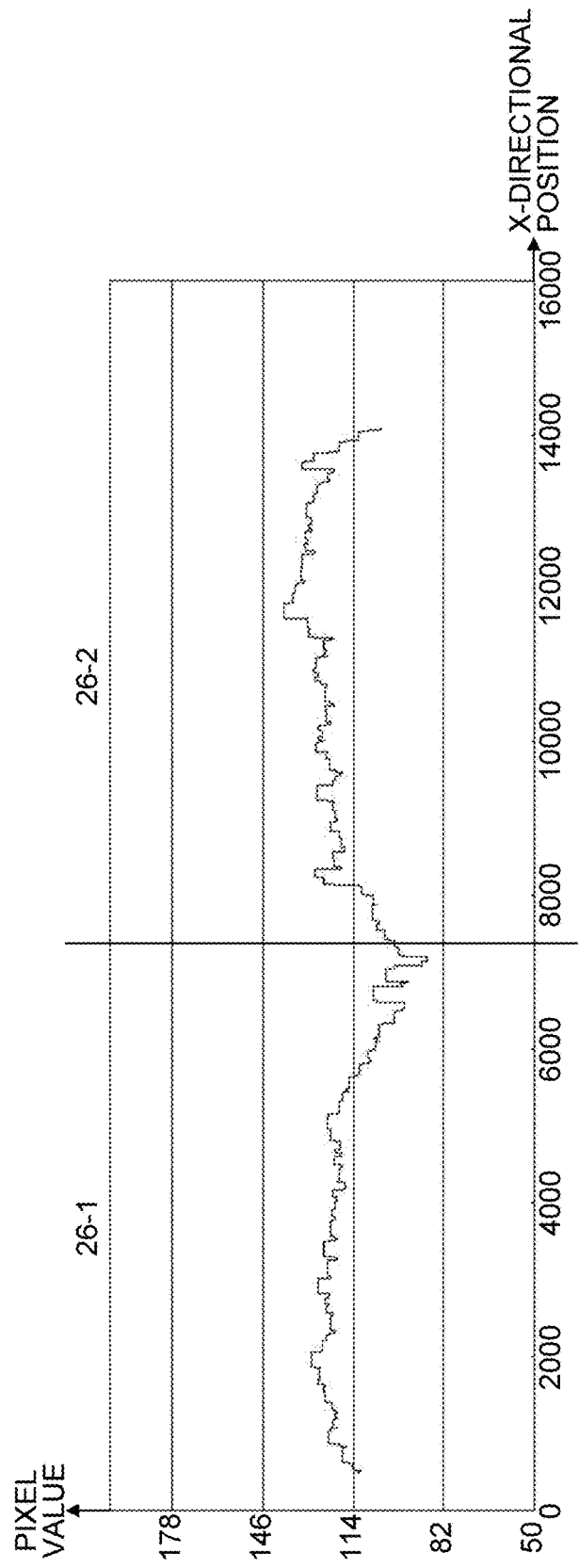
FIG. 24 is a diagram illustrating a difference between maximum and minimum pixel values in each divided reading region, which are calculated from the pixel values in the read image of the non-ejection detecting pattern.

FIG. 24 illustrates a difference S(i) between maximum and minimum pixel values in each divided reading region, which are calculated from the pixel values illustrated in FIG. 23, when the divided reading regions, each including 200 pixels, are obtained by dividing the reading region of the image capturing unit 130. The variable i represents a pixel position in the X direction. In this example, the difference S(i) is used as the CTF, but the CTF may be a value obtained by dividing S(i) by a difference between a minimum pixel value in the solid part of each divided reading region and a maximum pixel value in the blank part thereof, as in Equation 1.

As illustrated in FIG. 24, the CTF is poor in regions T1 and T2 illustrated in FIG. 23. In this example, the optical units 26-1 and 26-2 are used as the image capturing unit 130, and each have a CTF that degrades as closer to the periphery of a lens. Moreover, the CTFs of the optical units 26-1 and 26-2 are compared to find that the degradation differs therebetween. This is because of variation in manufacturing and the accuracy of assembly.

Calculation of Streak Inspection Threshold and Printing-Position Shift Detection Threshold For example, the ink-jet recording apparatus 80 uses Equations 2 and 3 below to calculate, for a predetermined reference streak inspection threshold Xs and a reference printing-position shift detection threshold Xn, a streak inspection threshold fs(S(i)) and a printing-position shift detection threshold fn(S(i)) of each divided reading region in accordance with S(i) calculated as described above.

$$fs(S(i)) = Xs \times \frac{S(i)}{S_{max}} \quad \text{(Equation 2)}$$

$$fn(S(i)) = Xn \times \frac{S(i)}{S_{max}} \quad \text{(Equation 3)}$$

The above-described $S_{max}$ is a maximum value of S(0) to S(7400) (that is, a maximum value of the CTF of the optical unit 26-1) for 0≤i≤7400, or a maximum value of S(7401) to S(14800) (that is, a maximum value of the CTF of the optical unit 26-2) for 7401≤i≤14800.

In this manner, the reference streak inspection threshold Xs and the reference printing-position shift detection threshold Xn are corrected using S(i) of each divided reading region, thereby achieving appropriate execution of the non-ejection nozzle detection and the printing-position shift detection (ejection misaligned nozzle detection). According to the present embodiment, the non-ejection detecting pattern 90 can be used for the CTF acquisition, the non-ejection nozzle detection, and the printing-position shift detection.

Selection of Line Sensor for Overlapping Reading Region

Figure 25:
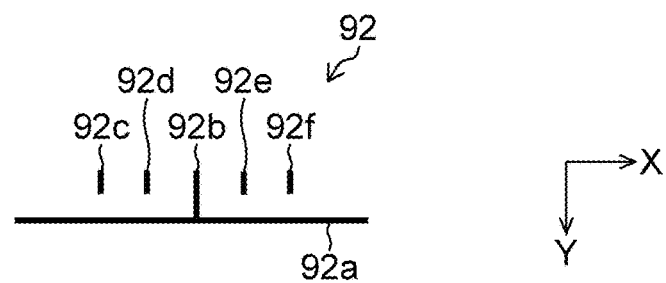
FIG. 25 is a diagram illustrating an exemplary overlapping-reading region detecting pattern.

Selection of a line sensor in an overlapping reading region will be described below. The following first describes a method of acquiring the range of an overlapping reading region of a plurality of optical units. FIG. 25 illustrates an exemplary overlapping-reading region detecting pattern 92. As illustrated in FIG. 25, the overlapping-reading region detecting pattern 92 includes a line 92a extending in the X direction, a line 92b extending in the Y direction and orthogonal to the line 92a at the center of the line 92a in the X direction, and lines 92c, 92d, and 92e, and 92f arranged at a known interval in the X direction and extending in the Y direction.

Figure 26:
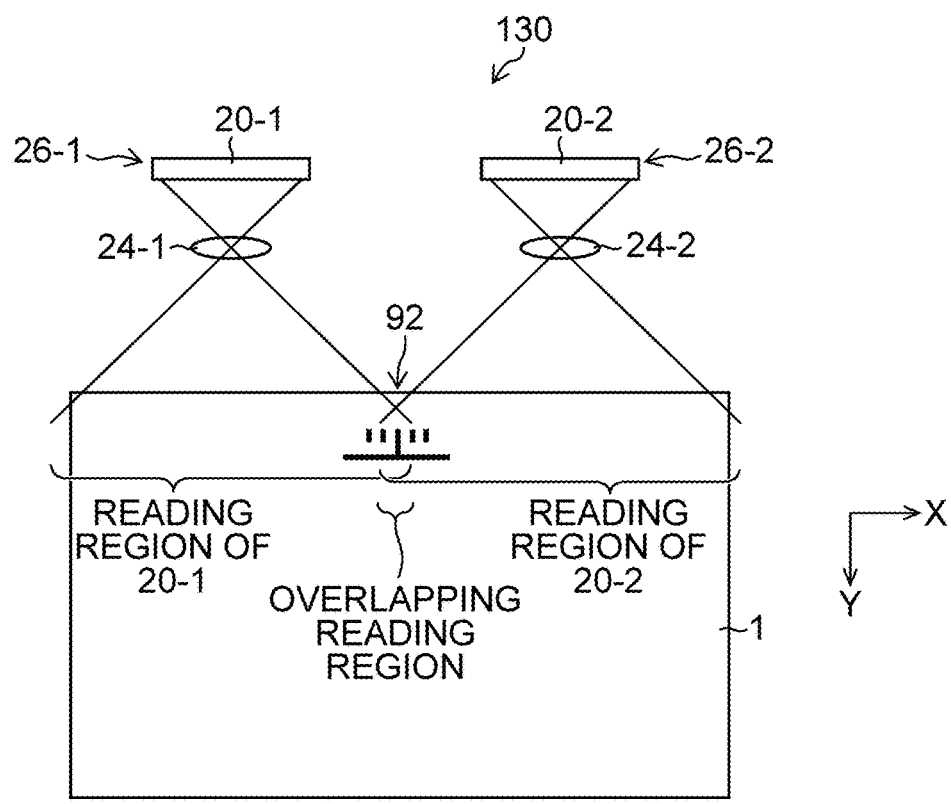
FIG. 26 schematically illustrates image capturing of a sheet on which the overlapping-reading region detecting pattern is printed.

FIG. 26 schematically illustrates image capturing of, through the image capturing unit 130, the sheet 1 on which the overlapping-reading region detecting pattern 92 is printed. In the overlapping-reading region detecting pattern 92, the line 92b is printed at the center of the sheet 1 in the X direction.

FIGS. 27A and 27B are each a diagram illustrating a read image of the overlapping-reading region detecting pattern 92, which is obtained by the image capturing unit 130. FIG. 27A illustrates the read image obtained by the line sensor 20-1, and FIG. 27B illustrates the read image obtained by the line sensor 20-2. The examining unit 200 (exemplary range acquiring device) detects, from these two read images, overlapping reading regions of the reading regions of the line sensors 20-1 and 20-2. In this example, pixel $PX_{7400}$ of the line sensor 20-1 reads the same part as that read by pixel $PX_{8000}$ of the line sensor 20-2. In addition, pixel $PX_{7401}$ of the line sensor 20-2 reads the same part as that read by pixel $PX_{7000}$ of the line sensor 20-1. Thus, a region of pixel $PX_{7000}$ to pixel $PX_{7400}$ of the line sensor 20-1 and a region of pixel $PX_{7401}$ to pixel $PX_{8000}$ of the line sensor 20-2 are the ranges of mutually overlapping reading regions.

In this manner, the actual range of overlapping reading regions can be obtained even when the overlapping reading regions are different between apparatuses due to variation in manufacturing and the accuracy of assembly.

Next, the examining unit 200 compares the CTFs of the optical units 26-1 and 26-2 in the overlapping reading region so as to select which of images captured by the optical units is to be prioritized for the overlapping reading region.

The examining unit 200 defines, by Equations 4 and 5 below, CTF_1 and CTF_2 that are the CTFs of the optical units 26-1 and 26-2, respectively, in the overlapping reading region.

$$CTF\_1 = \sum_{k=7000}^{7400} S(k)/(7400-7000+1) \quad \text{(Equation 4)}$$

$$CTF\_2 = \sum_{k=7401}^{8000} S(k)/(8000-7401+1) \quad \text{(Equation 5)}$$

Finally, the examining unit 200 compares CTF_1 and CTF_2 thus calculated, and prioritizes the read image of the line sensor 20-1 in the overlapping reading region for CTF_1≥CTF_2 or prioritizes the read image of the line sensor 20-2 in the overlapping reading region for CTF_1<CTF_2.

Such a comparison of the CTFs of the overlapping reading region enables appropriate selection of the read image of the line sensor of an optical unit the CTF of which is high.

Selection of Line Sensor in Overlapping Reading Region

In the above-described example, the threshold correction is performed for all regions in the X direction based on a result of the CTF detection, but may be performed only for a region with a significantly poor CTF. In the example illustrated in FIG. 24, the CTF degrades only near a connection between the optical unit 26-1 and the optical unit 26-2 due to degradation of the CTF characteristic at end parts of the lens units 24-1 and 24-2. Thus, the threshold correction may be performed only for this region for which the CTF degrades.

Specifically, a maximum value Max(S(i)) of S(i) is searched for each divided region so as to calculate an absolute value D(i) of a difference between S(i) and the maximum value Max(S(i)) in each divided reading region. In other words, the absolute value D(i) of the difference can be expressed by Equation 6 below.

$$D(i) = \text{Max}(S(i)) - S(i) \quad \text{(Equation 6)}$$

The streak inspection threshold and the printing-position shift detection threshold are corrected for a divided reading region for which D(i) is equal to or larger than a previously set correction threshold. In other words, the thresholds for a divided reading region with a relatively low CTF as compared to other divided reading regions in the reading region are corrected to be lower. The correction threshold may be set to, for example, 30.

Since S(i) is an average of values of 200 pixels, for example, no abnormal value exists only for one pixel. Thus, a simple search for a maximum value is sufficient.

Printing of Image and Non-Ejection Detecting Pattern

When printing an image corresponding to a printing job onto the sheet 1, the ink-jet recording apparatus 80 prints the non-ejection detecting pattern 90 on, for example, a blank space of each sheet 1 (example of each recording medium) so as to detect any non-ejection nozzle and any ejection misaligned nozzle. In this processing, the CTF of each divided reading region of the image capturing unit 130 is acquired for each sheet 1. Accordingly, the CTF can be acquired in accordance with the state of the sheet 1 even when, for example, a wrinkle is generated on the sheet 1. Thus, the streak inspection threshold and the printing-position shift detection threshold can be corrected in accordance with the state of the sheet 1, so that the streak inspection and the printing-position shift detection can be performed appropriately.

Index Indicating Contrast of Optical Unit (Image Capturing Unit)

In the above, the CTF is used as an index indicating the contrast of the optical unit 26 or the image capturing unit 130, but an MTF may be used as the index. In this case, the MTF of each of the divided reading regions of the optical unit 26 and the image capturing unit 130 (optical units 26-1 and 26-2) may be acquired based on a read image obtained by reading an MTF acquisition gradation pattern (continuous gradation pattern).

Apparatus Application

The above-described embodiments each describe the example of application to an ink-jet recording apparatus for graphic printing, but the range of application of the present invention is not limited to this example. For example, the present invention is widely applicable to an ink-jet apparatus that draws various shapes and patterns using liquid functional material, such as a wire drawing apparatus that draws a wiring pattern of an electronic circuit, an apparatus for manufacturing various devices, a resist recording apparatus that uses resin solution as functional liquid for ejection, a color filter manufacturing apparatus, and a fine structural object forming apparatus that forms a fine structural object using a material for material deposition.

Usage of Recording Head Other than Ink-Jet Recording Head

The above describes an ink-jet recording apparatus as an exemplary image forming apparatus using a recording head, but the range of application of the present invention is not limited thereto. The present invention is applicable to various types of image forming apparatuses that perform dot recording other than the ink-jet recording apparatus, such as a thermal transfer recording apparatus that includes a recording head including a thermal element as a recording element, an LED electronic picture printer that includes a recording head including an LED element as a recording element, and a silver halide photography printer including an LED line exposure head.

The technical scope of the present invention is not limited to that described in the above embodiments. Components and the like in each embodiment may be combined as appropriate between the embodiments without departing from the gist of the present invention.

What is claimed is:

1. An examining apparatus, comprising:
a reading device configured to read an image recorded by a recording head and to output a reading result and including at least one optical unit including an image capturing element and a lens;
an analyzing device configured to analyze a state of the recording head or a state of the image by comparing the reading result to a threshold;
an index acquiring device configured to acquire an index indicating contrast performance of the optical unit for each of divided reading regions obtained by dividing a reading region of the reading device into a plurality of regions; and
a correcting device configured to correct the threshold for the divided reading region based on the acquired index.

2. The examining apparatus according to claim 1, wherein the correcting device corrects the threshold to be lower for a divided reading region for which the contrast performance is lower.

3. The examining apparatus according to claim 1, wherein the correcting device corrects the threshold to be lower for a divided reading region for which the contrast performance is relatively low in the reading region.

4. The examining apparatus according to claim 1, wherein:
the reading device includes a plurality of optical units, parts of reading regions of the plurality of optical units overlapping with each other,
the examining apparatus includes a selecting device configured to select an optical unit a reading result of which is used by the analyzing device to analyze the state of the image for the overlapping reading regions,
the index acquiring device acquires the index of each optical unit of the plurality of optical units for the overlapping reading regions, and
the selecting device selects the reading result of an optical unit the contrast performance of which is high.

5. The examining apparatus according to claim 4, further comprising a range acquiring device configured to acquire ranges of the overlapping reading regions in the reading region of each optical unit of the plurality of optical units.

6. An image recording apparatus, comprising:
a conveying device configured to convey a sheet recording medium;
a recording head configured to record an image on the conveyed recording medium by a single pass method through a plurality of recording elements; and
the examining apparatus according to claim 1 configured to examine the conveyed recording medium.

7. The image recording apparatus according to claim 6, wherein the recording head is an ink-jet head configured to eject ink from a plurality of nozzles to record an image on the recording medium.

8. The image recording apparatus according to claim 7, wherein:
the ink-jet head records, on the recording medium, a non-ejection detecting pattern for detecting a non-ejection nozzle;
the reading device reads the non-ejection detecting pattern;
the index acquiring device acquires a contrast transfer function as the index based on a reading result of the non-ejection detecting pattern; and
the analyzing device detects an ejection misaligned nozzle based on the corrected threshold and the reading result of the non-ejection detecting pattern.

9. The image recording apparatus according to claim 8, wherein:

the ink-jet head records the non-ejection detecting pattern on each conveyed recording medium; and the index acquiring device acquires the index for the conveyed recording medium.

10. The image recording apparatus according to claim 6, wherein the analyzing device detects a strength of a streak generated in the image based on a reading result obtained by the reading device and performs streak defect determination of the image by comparing the detected strength of the streak to a threshold.

11. An examining method, comprising:

a reading step of reading, by a reading device including at least one optical unit including an image capturing element and a lens, an image recorded by a recording head, and of outputting a reading result;

an analyzing step of analyzing a state of the recording head or a state of the image by comparing the reading result and a threshold;

an index acquiring step of acquiring an index indicating contrast performance of the optical unit for each of divided reading regions obtained by dividing a reading region of the reading device into a plurality of regions; and a correcting step of correcting the threshold for the divided reading region based on the acquired index.

12. A non-transitory tangible computer-readable recording medium including instructions stored thereon, such that when the instructions are read and executed by a processor of a computer, the processor is configured to cause the computer to achieve:

a reading function of reading, by a reading device including at least one optical unit including an image capturing element and a lens, an image recorded by a recording head, and of outputting a reading result;

an analyzing function of analyzing a state of the recording head or a state of the image by comparing the reading result to a threshold;

an index acquiring function of acquiring an index indicating contrast performance of the optical unit for each of divided reading regions obtained by dividing a reading region of the reading device into a plurality of regions; and a correcting function of correcting the threshold for the divided reading region based on the acquired index.

* * * * *